(12) United States Patent
Michisaka et al.

(10) Patent No.: US 9,866,034 B2
(45) Date of Patent: Jan. 9, 2018

(54) POWER TRANSFER UNIT, METHOD FOR POWER TRANSFER, AND RECEIVER

(71) Applicant: Funai Electric Co., Ltd., Daito-shi, Osaka (JP)

(72) Inventors: Takao Michisaka, Kumagaya (JP); Naoyuki Wakabayashi, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 378 days.

(21) Appl. No.: 14/593,523

(22) Filed: Jan. 9, 2015

(65) Prior Publication Data

US 2015/0200549 A1    Jul. 16, 2015

(30) Foreign Application Priority Data

Jan. 10, 2014 (JP) ................. 2014-003683

(51) Int. Cl.
| | |
|---|---|
| *H02J 3/14* | (2006.01) |
| *H02J 5/00* | (2016.01) |
| *H02J 7/02* | (2016.01) |
| *H01F 38/14* | (2006.01) |

(52) U.S. Cl.
CPC .............. *H02J 5/005* (2013.01); *H01F 38/14* (2013.01); *H02J 7/025* (2013.01); *Y10T 307/406* (2015.04)

(58) Field of Classification Search
CPC .............. H04N 1/00315; G06F 1/1698; G06F 1/1863; G06F 2213/3814; G06F 21/35; G06F 21/43
See application file for complete search history.

(56) References Cited

U.S. PATENT DOCUMENTS

| | | | |
|---|---|---|---|
| 8,664,802 B2* | 3/2014 | Fukada | H02J 17/00 307/104 |
| 9,099,880 B2* | 8/2015 | Wesemann | H02J 5/005 |
| 9,106,096 B2 | 8/2015 | Kato | |
| 9,318,258 B2* | 4/2016 | Yamakawa | H01F 38/14 |
| 2010/0144402 A1* | 6/2010 | Watanabe | G06K 19/0723 455/572 |
| 2011/0260532 A1 | 10/2011 | Tanabe | |
| 2012/0001485 A1* | 1/2012 | Uchida | H02J 5/005 307/11 |
| 2012/0242158 A1* | 9/2012 | Lee | H02J 5/005 307/104 |
| 2012/0307977 A1* | 12/2012 | Krumme | H02J 5/005 378/107 |
| 2013/0002036 A1 | 1/2013 | Kamata | |
| 2013/0062961 A1 | 3/2013 | Park et al. | |
| 2013/0154382 A1* | 6/2013 | Kurata | H02J 17/00 307/104 |
| 2013/0342024 A1 | 12/2013 | Byun et al. | |

(Continued)

FOREIGN PATENT DOCUMENTS

| | | |
|---|---|---|
| EP | 2 876 773 A2 | 5/2015 |
| JP | 2007-89341 A | 4/2007 |

(Continued)

*Primary Examiner* — Jared Fureman
*Assistant Examiner* — Esayas Yeshaw
(74) *Attorney, Agent, or Firm* — Crowell & Moring LLP

(57) ABSTRACT

This power transfer unit includes a power supply portion and a control portion, and the control portion acquires proper voltage ranges of a plurality of receivers and sets a supply voltage value in a common range among the proper voltage ranges.

19 Claims, 20 Drawing Sheets

(56) References Cited

U.S. PATENT DOCUMENTS

| | | | | |
|---|---|---|---|---|
| 2014/0132206 A1* | 5/2014 | Zhu | ............ | H02J 7/025 320/108 |
| 2014/0327409 A1* | 11/2014 | Lee | ............ | H02J 7/025 320/137 |
| 2015/0102685 A1* | 4/2015 | Blood | ............ | H02J 5/005 307/104 |
| 2015/0137611 A1* | 5/2015 | Huang | ............ | H02J 5/005 307/104 |
| 2016/0049826 A1* | 2/2016 | Lee | ............ | H02J 7/025 320/108 |

FOREIGN PATENT DOCUMENTS

| | | |
|---|---|---|
| JP | 2010-104103 A | 5/2010 |
| JP | 2010-288442 A | 12/2010 |
| JP | 2011-193707 A | 9/2011 |
| JP | 2013-34367 A | 2/2013 |
| JP | 2013-90483 A | 5/2013 |

* cited by examiner

| RECEIVER | FIRST SUPPLY VOLTAGE RANGE[V] | | PROPER VOLTAGE RANGE[V] | |
|---|---|---|---|---|
| | VTn_MIN | VTn_MAX | VRn_MIN | VRn_MAX |
| SMARTPHONE | 3.0 | 5.0 | 15.0 | 25.0 |
| TABLET | 4.0 | 8.0 | 20.0 | 30.0 |
| DIGITAL CAMERA | 1.0 | 2.5 | 10.0 | 15.0 |

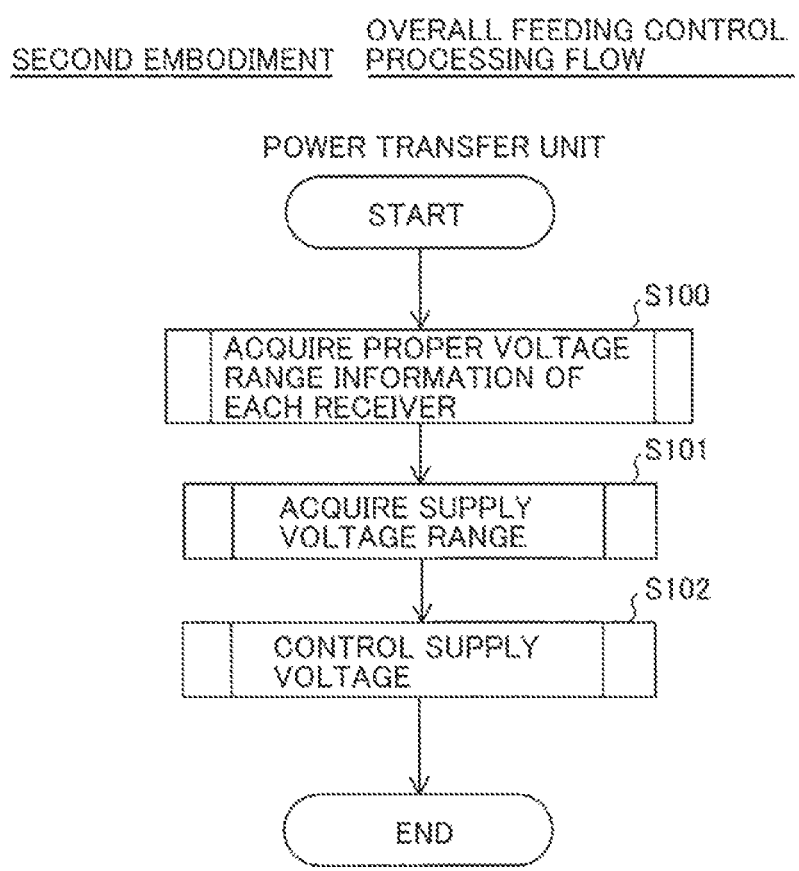

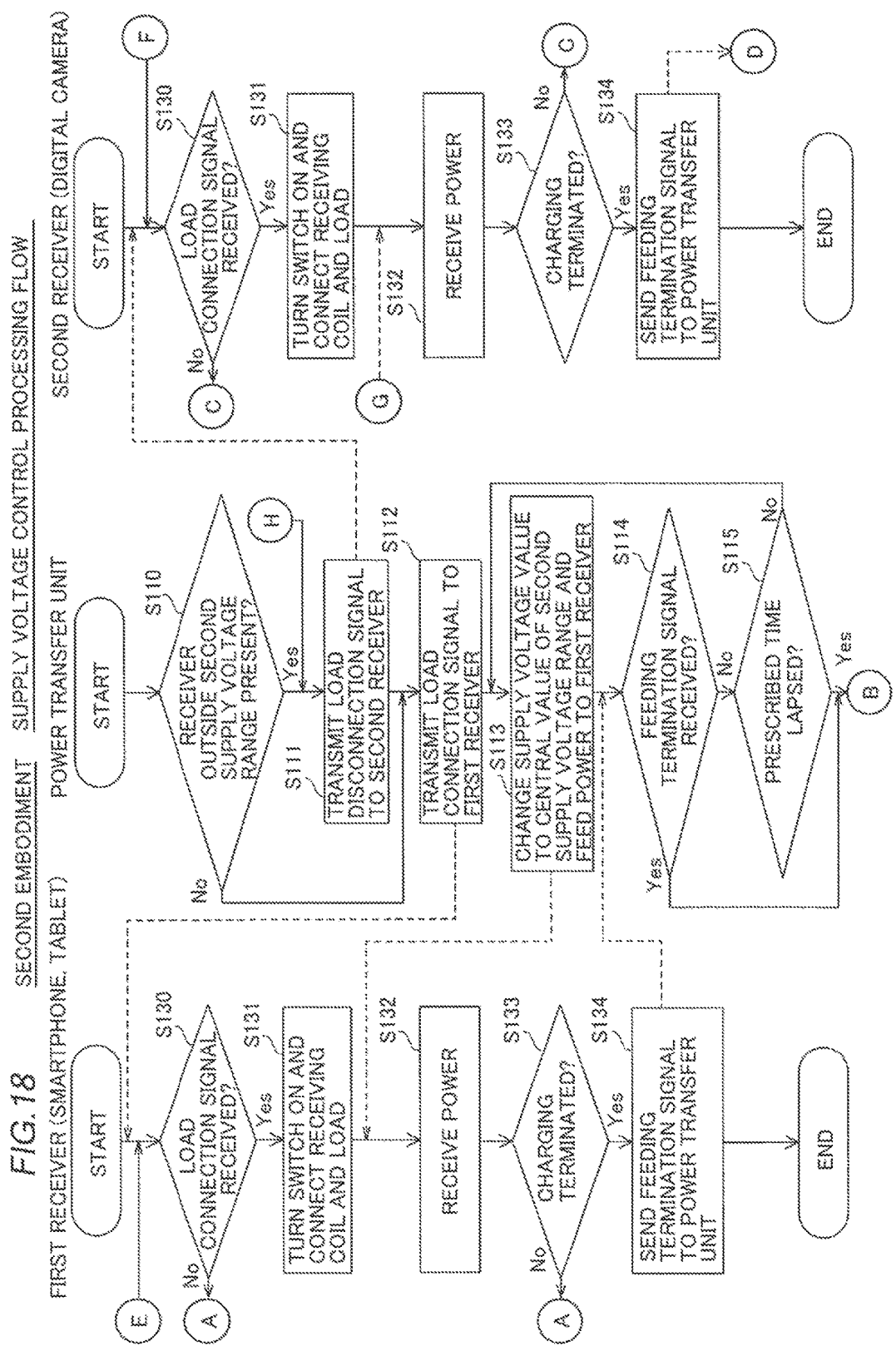

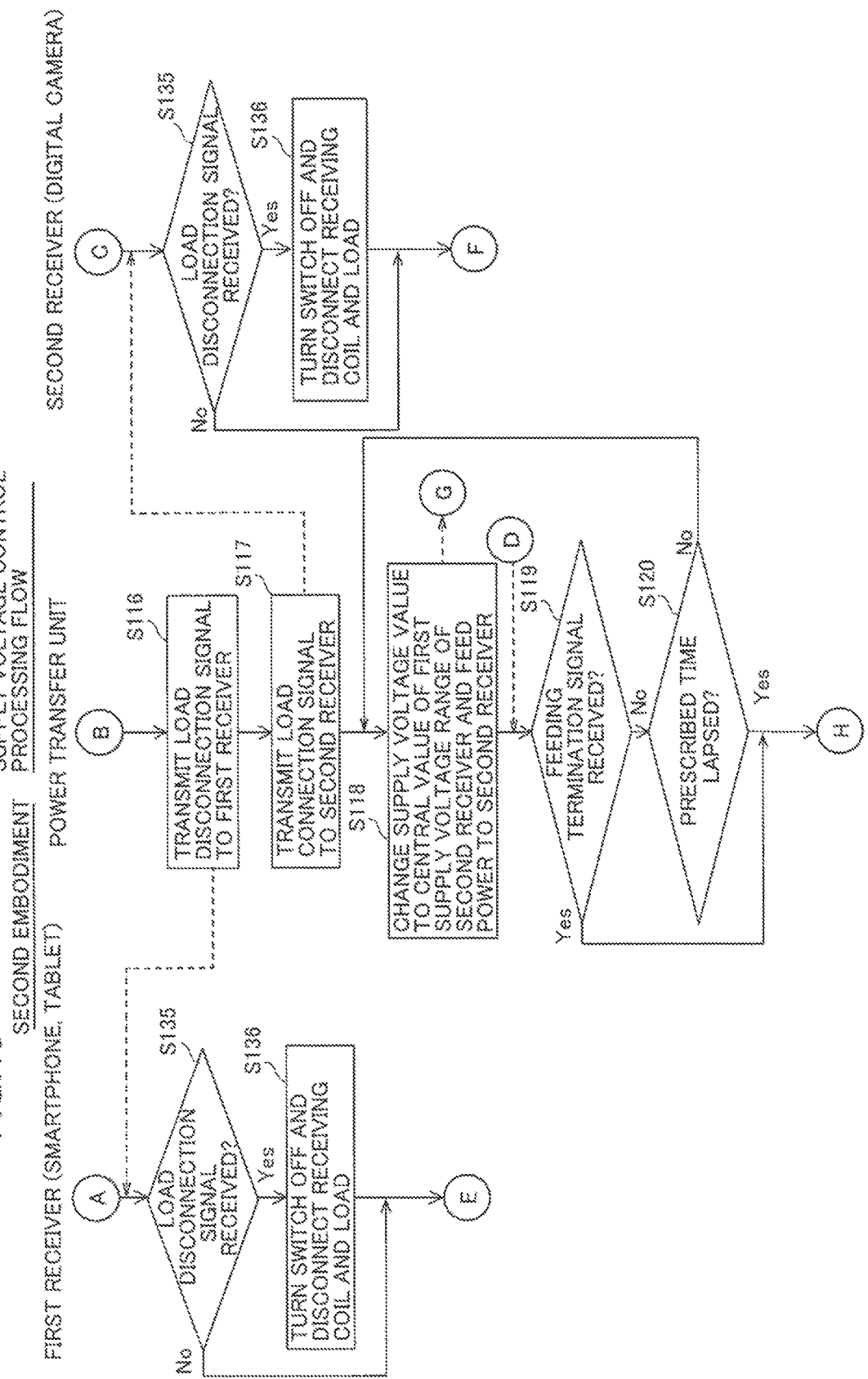

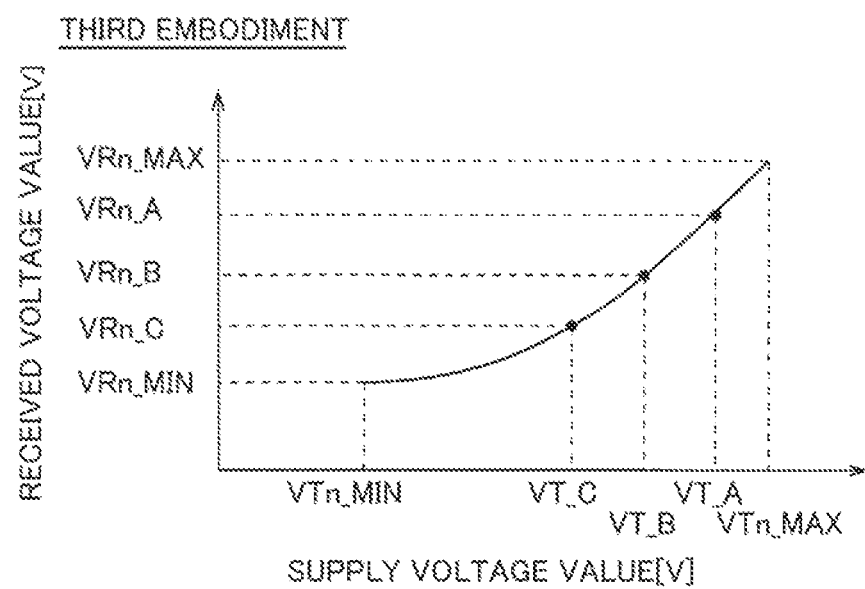

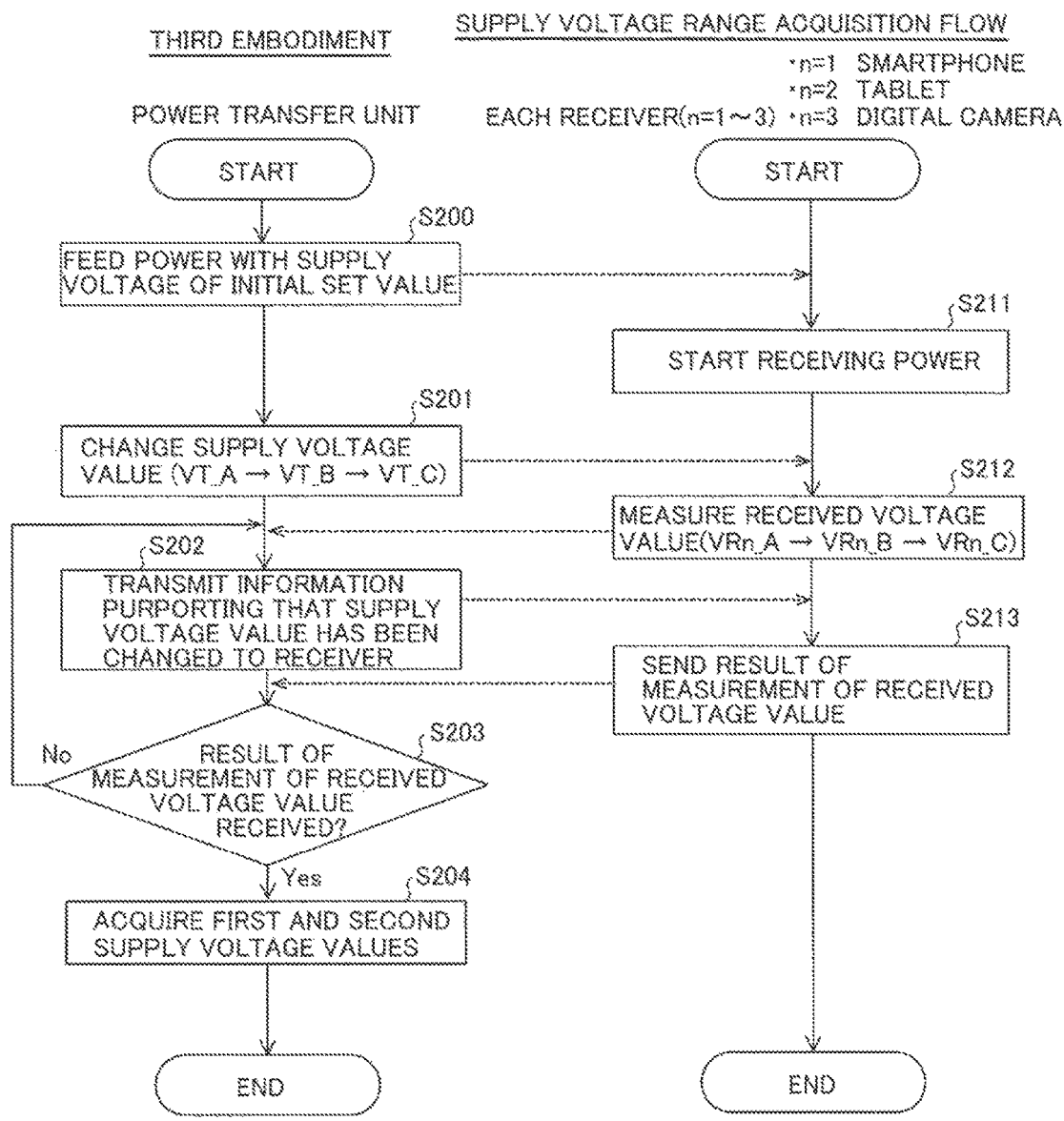

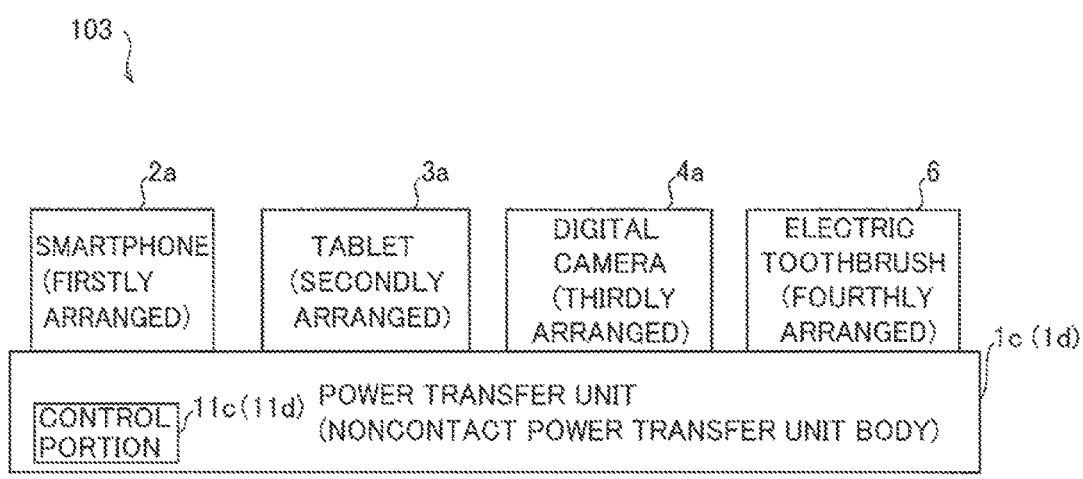
FIG.22 FOURTH EMBODIMENT (MODIFICATION)

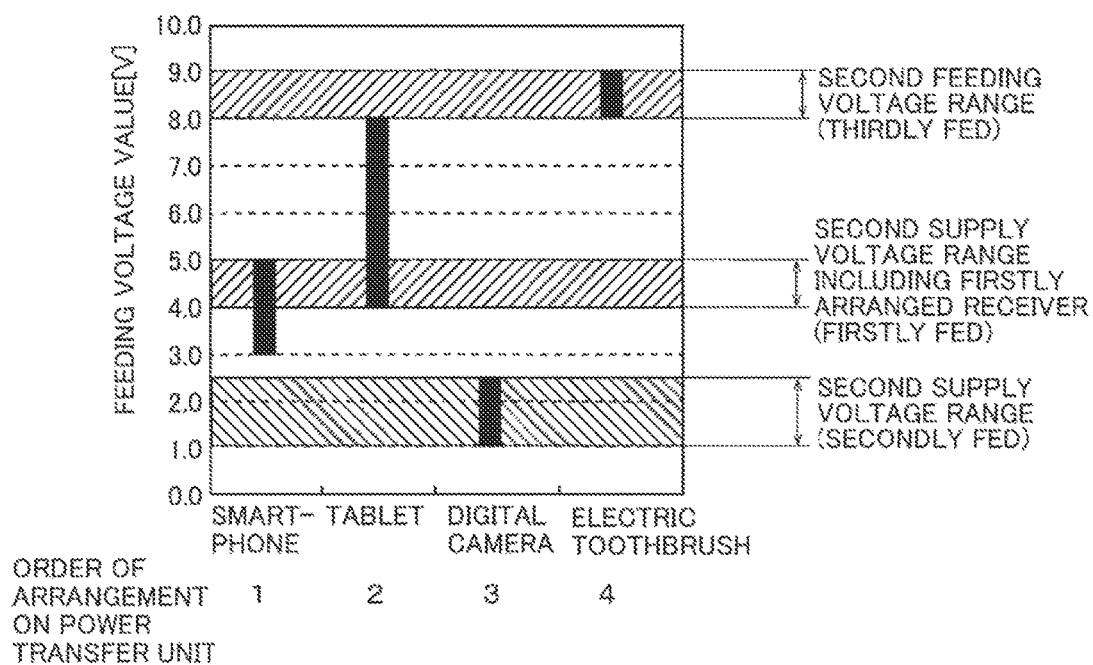

POWER TRANSFER UNIT, METHOD FOR POWER TRANSFER, AND RECEIVER

BACKGROUND OF THE INVENTION

Field of the Invention

The present invention relates to a power transfer unit, a method for power transfer, and a receiver.

Description of the Background Art

A power transfer unit, a method for power transfer, and a receiver are known in general, as disclosed in Japanese Patent Laying-Open No. 2013-034367, for example.

The aforementioned Japanese Patent Laying-Open No. 2013-034367 discloses a power transfer unit including a control circuit detecting the sum of power supplied to a plurality of fed apparatuses (receivers). In this power transfer unit, the control circuit is configured to detect the sum of the power supplied to the plurality of fed apparatuses and to change the capacitance of a variable capacitor provided in the power transfer unit on the basis of the detected sum of the power. The control circuit is further configured to supply power to those requiring power feeding among the plurality of fed apparatuses subjected to the detection of the sum of the supplied power.

In the power transfer unit according to the aforementioned Japanese Patent Laying-Open No. 2013-034367, however, the control circuit is configured to feed power to a plurality of fed apparatuses requiring power feeding, and hence the same may supply a voltage exceeding a received voltage value allowed by any of the fed apparatuses, for example. In this case, the fed apparatus supplied with power exceeding the allowable received voltage value may problematically cause a malfunction or the like.

SUMMARY OF THE INVENTION

The present invention has been proposed in order to solve the aforementioned problem, and an object of the present invention is to provide a power transfer unit, a method for power transfer, and a receiver each capable of suppressing occurrence of a malfunction or the like also when simultaneously feeding power to a plurality of receivers.

In order to attain the aforementioned object, a power transfer unit according to a first aspect of the present invention includes a power supply portion and a control portion controlling the power supply portion, while the control portion acquires proper voltage ranges of a plurality of receivers and sets a supply voltage value in a common range among the proper voltage ranges. Throughout this specification, the term "proper voltage range" denotes a concept including the optimum voltage range defined according to A4WP (Alliance for Wireless Power) standards.

In the power transfer unit according to the first aspect of the present invention, as hereinabove described, the control portion acquires the proper voltage ranges of the plurality of receivers and sets the supply voltage value in the common range among the proper voltage ranges, whereby the power transfer unit can feed power to the plurality of receivers within the range (within the proper voltage range) of received voltage values allowed by the plurality of receivers. Consequently, the power transfer unit can suppress occurrence of a malfunction or the like also when simultaneously feeding power to the plurality of receivers.

In the aforementioned power transfer unit according to the first aspect, the control portion preferably supplies power to the receivers at more than one supply voltage value to acquire received voltage value information and sets the supply voltage value based on the received voltage value information which has been acquired. According to this structure, the control portion can acquire the range of the supply voltage value of the power supply portion corresponding to the proper voltage ranges of the plurality of receivers, whereby the same can easily set the supply voltage value of the power supply portion in the common range among the proper voltage ranges of the plurality of receivers.

In this case, the control portion preferably supplies power to the receivers at a prescribed supply voltage value and supplies power to the receivers at the supply voltage value different from the prescribed supply voltage value to acquire the received voltage value information. According to this structure, the range of the supply voltage value of the power supply portion corresponding to the proper voltage ranges of the plurality of receivers can be easily acquired.

In the aforementioned power transfer unit supplying power to the receivers at the prescribed supply voltage value and the supply voltage value different from the prescribed supply voltage value to acquire the received voltage value information, the control portion preferably changes the supply voltage value of the power supply portion from VT_A to VT_B by $\Delta VT$, to acquire approximate minimum values VRn_MIN and approximate maximum values VRn_MAX of proper voltage values of the plurality of receivers and received voltage values VRn_A and VRn_B of the plurality of receivers fed with power at the supply voltage value and calculates an approximate minimum value VTn_MIN and an approximate maximum value VTn_MAX of the supply voltage value through the following equations (1) and (2) assuming that $\Delta VRn$ represents the difference between the received voltage values VRn_A and VRn_B:

$$VTn\_MIN = (VRn\_MIN - VRn\_A) \times \frac{\Delta VT}{\Delta VRn} + VT\_A \quad (1)$$

$$VTn\_MAX = (VRn\_MAX - VRn\_A) \times \frac{\Delta VT}{\Delta VRn} + VT\_A \quad (2)$$

According to this structure, the control portion can easily acquire the range of the supply voltage value of the power supply portion corresponding to the proper voltage ranges of the plurality of receivers. In this specification, the approximate minimum value denotes a minimum value or a value close to the minimum value, and the approximate maximum value denotes a maximum value or a value close to the maximum value.

In the aforementioned power transfer unit according to the first aspect, the control portion preferably acquires respective first supply voltage ranges corresponding to the proper voltage ranges of the plurality of receivers for the respective ones of the plurality of receivers and sets the supply voltage value in a second supply voltage range common to the first supply voltage ranges. According to this structure, the power transfer unit can simultaneously feed power to all receivers having proper voltage values in the second supply voltage range when the control portion controls the supply voltage value of the power supply portion to be in the acquired second supply voltage range.

In this case, the control portion preferably feeds power to the receivers based on the order of arrangement of the receivers on the body of the power transfer unit when a plurality of non-overlapping second voltage ranges are present. According to this structure, the power transfer unit feeds power to the receivers along the order corresponding to that along which the user has arranged the receivers on the body of the power transfer unit, whereby the same can feed power to the receivers along the order intended by the user.

In the aforementioned power transfer unit including the control portion acquiring the first and second supply voltage ranges, the control portion preferably feeds power to a receiver firstly arranged on the body of the power transfer unit when a plurality of non-overlapping second supply voltage ranges are present. When the user arranges a plurality of receivers on the body of the power transfer unit, he/she conceivably intends to start power feeding from the firstly arranged receiver. In consideration of this point, the control portion feeds power to the receivers from the firstly arranged one, whereby the power transfer unit can start power feeding from the receiver intended by the user.

The aforementioned power transfer unit including the control portion acquiring the first and second supply voltage ranges preferably further includes a transmission portion transmitting a posting signal purporting that the position of a prescribed receiver is to be changed to the prescribed receiver. According to this structure, the prescribed receiver is set to a receiver outside the second supply voltage range, whereby the receiver outside the second supply voltage range can acquire the purport that the position is to be changed and post this purport to the user. When the user moves the receiver outside the second supply voltage range to a position inside the second supply voltage range, the power transfer unit can simultaneously feed power to a larger number of receivers due to the movement of the receiver outside the second supply voltage range to the position inside the second supply voltage range.

The aforementioned power transfer unit including the control portion acquiring the first and second supply voltage ranges preferably further includes a transmission portion transmitting a posting signal purporting that the position of at least one of the receivers is to be changed for enlarging the second supply voltage range to at least one of the receivers based on upper and lower limits of the first supply voltage ranges in the plurality of receivers. According to this structure, the second supply voltage range can be so enlarged that the power transfer unit can be inhibited from feeding power in excess of the range of the proper voltage values even if the supply voltage value temporarily fluctuates, for example, due to the enlargement of the second supply voltage.

The aforementioned power transfer unit including the control portion acquiring the first and second supply voltage ranges preferably further includes a transmission portion transmitting a signal purporting that power receiving is to be stopped to a prescribed receiver. According to this structure, the prescribed receiver is set to a receiver outside the second supply voltage range, whereby the receiver outside the second supply voltage range stops receiving power, whereby a load of the receiver is prevented from application of a supply voltage exceeding the proper voltage value. Consequently, the power transfer unit can be reliably inhibited from feeding power exceeding the proper voltage value.

In the aforementioned power transfer unit including the transmission portion transmitting the signal purporting that power receiving is to be stopped, the control portion preferably transmits the signal purporting that power receiving is to be stopped to a receiver inside the second supply voltage range through the transmission portion based on acquisition of feeding termination information feeds power to the prescribed receiver. According to this structure, the power transfer unit can feed power also to a receiver having stopped receiving power in the common range among the proper voltage ranges of the receivers.

In the aforementioned power transfer unit including the transmission portion transmitting the signal purporting that power receiving is to be stopped, the control portion preferably alternately performs a control operation of transmitting the signal purporting that power receiving is to be stopped and a control operation of feeding power on a receiver inside the second supply voltage range and the prescribed receiver at a prescribed time interval. According to this structure, the prescribed receiver is set to a receiver outside the second supply voltage range, whereby the power transfer unit can alternately feed power to the receivers inside and outside the second supply voltage range in the range of the proper voltage values of the receivers in common, whereby the same can feed power to the receivers inside and outside the second supply voltage range to some extent, also when a charging time is short.

In the aforementioned power transfer unit according to the first aspect, the control portion preferably acquires the range of the supply voltage value by linear approximation or approximation to a quadratic or higher function based on the received voltage value information. According to this structure, the control portion can easily acquire the range of the supply voltage value, whereby the same can control the supply voltage value of the power supply portion in the common range among the proper voltage values of the plurality of receivers.

In the aforementioned power transfer unit according to the first aspect, the control portion preferably sets the supply voltage value to a central value in the common range among the proper voltage ranges of the plurality of receivers. According to this structure, the power transfer unit can be inhibited from feeding power with a voltage out of the proper voltage ranges even if the supply voltage value temporarily fluctuates, for example.

In the aforementioned power transfer unit according to the first aspect, the control portion preferably sets the supply voltage value to a value larger than a central value in the common range among the proper voltage ranges of the plurality of receivers. According to this structure, the speed of power feeding can be increased as compared with the case where the supply voltage value is set to the central value.

A method for power transfer according to a second aspect of the present invention includes steps of acquiring proper voltage ranges of a plurality of receivers and setting a supply voltage value in a common range among the proper voltage ranges.

As hereinabove described, the method for power transfer according to the second aspect of the present invention includes the steps of acquiring the proper voltage ranges of the plurality of receivers and setting the supply voltage value in the common range among the proper voltage ranges, whereby power can be fed in the proper voltage ranges of the plurality of receivers by the method for power transfer according to the second aspect. Consequently, occurrence of a malfunction or the like can be suppressed also when power is simultaneously fed to the plurality of receivers.

A receiver according to a third aspect of the present invention includes a communication portion sending information of proper voltage ranges and a control portion sending the information of the proper voltage ranges through the communication portion to an external power transfer unit setting a supply voltage value in a common range among the proper voltage ranges of a plurality of receivers. Furthermore, the control portion sends received voltage value information to the external power transfer unit through the communication portion.

In the receiver according to the third aspect of the present invention, as hereinabove described, the control portion sends the information of the proper voltage ranges through the communication portion to the external power transfer unit setting the supply voltage value in the common range among the proper voltage ranges of the plurality of receivers, whereby in the receiver according to the third aspect, occurrence of a malfunction or the like can be suppressed also when the plurality of receivers simultaneously receive power. Furthermore, the control portion sends the received voltage value information to the external power transfer unit through the communication portion, whereby the external power transfer unit can easily set the supply voltage value of a power supply portion in the common range among the proper voltage ranges of the plurality of receivers.

The aforementioned receiver according to the third aspect preferably further includes a receiving portion receiving a posting signal purporting that the position of the receiver from the external power transfer unit is to be changed. According to this structure, the receiver outside a second supply voltage range can acquire the purport that the position is to be changed and post this purport to a user, for example.

The aforementioned receiver according to the third aspect preferably further includes a receiving portion receiving a signal purporting that power receiving from the external power transfer unit is to be stopped. According to this structure, the receiver outside the second supply voltage range stops receiving power, and hence a load of the receiver is prevented from application of a supply voltage exceeding the proper voltage values. Consequently, power feeding exceeding the proper voltage values can be reliably suppressed.

The aforementioned receiver according to the third aspect preferably further includes a charging information detection portion, and the control portion preferably sends power transfer termination information to the external power transfer unit through the communication portion based on charging information acquired by the charging information detection portion. According to this structure, the external power transfer unit can acquire the power transfer termination information, and hence the external power transfer unit can feed power also to the receiver having stopped receiving power in the common range among the proper voltage values of the receivers.

According to the present invention, as hereinabove described, occurrence of a malfunction or the like can be suppressed also in a case of simultaneously feeding power to a plurality of receivers.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a flowchart for illustrating the overall feeding control processing in the power transfer system according to the second embodiment of the present invention;

FIG. 18 is a flowchart (1) for illustrating supply voltage control processing in the power transfer system according to the second embodiment of the present invention;

FIG. 19 is a flowchart (2) for illustrating the supply voltage control processing in the power transfer system according to the second embodiment of the present invention;

FIG. 20 is a diagram for illustrating acquisition of first supply voltage ranges (quadratic function approximation) according to a third embodiment of the present invention;

FIG. 21 is a flowchart for illustrating processing for acquiring supply voltage ranges in a power transfer system according to the third embodiment of the present invention;

FIG. 22 is a schematic diagram for illustrating the order of arrangement of receivers in a power transfer system according to a fourth embodiment of the present invention; and FIG. 23 is a diagram for illustrating feeding order set processing in the power transfer system according to the fourth embodiment of the present invention.

DESCRIPTION OF THE PREFERRED EMBODIMENTS

Embodiments of the present invention are now described with reference to the drawings.

First Embodiment

The structure of a power transfer system (noncontact power transfer system) 100 according to a first embodiment of the present invention is described with reference to FIGS. 1 and 2.

Figure 1:
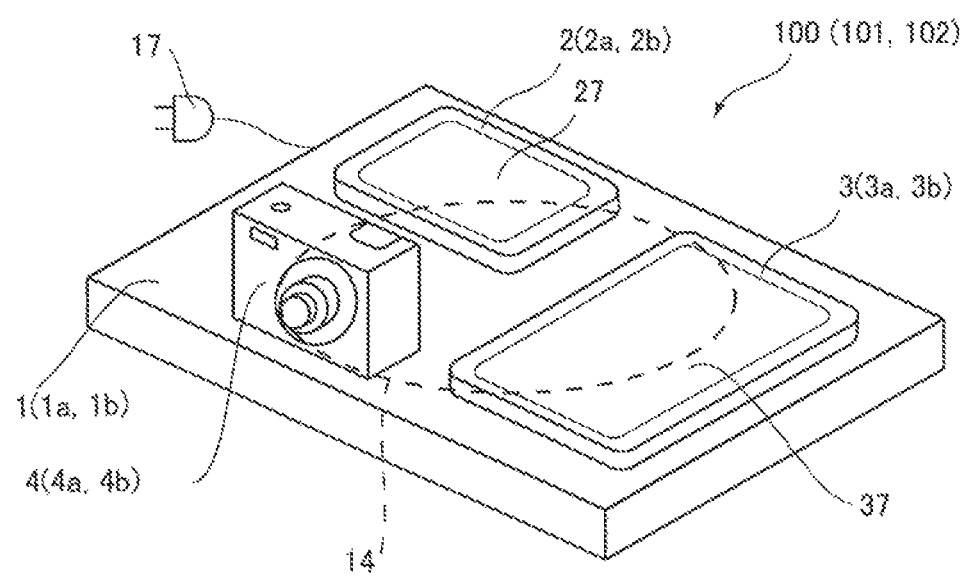
FIG. 1 illustrates the overall structure of a power transfer system according to a first embodiment of the present invention.

The power transfer system 100 according to the first embodiment includes a power transfer unit 1, a smartphone 2, a tablet 3 and a digital camera 4, as shown in FIG. 1. The smartphone 2, the tablet 3 and the digital camera 4 are arranged on the upper surface of a housing of the power transfer unit 1 provided in the form of a rectangular parallelepiped. The power transfer unit 1 is configured to wirelessly supply power (transfer power in a non-contact manner) to the smartphone 2, the tablet 3, and the digital camera 4. The smartphone 2, the tablet 3 and the digital camera 4 are examples of the "receivers" in the present invention.

Figure 2:
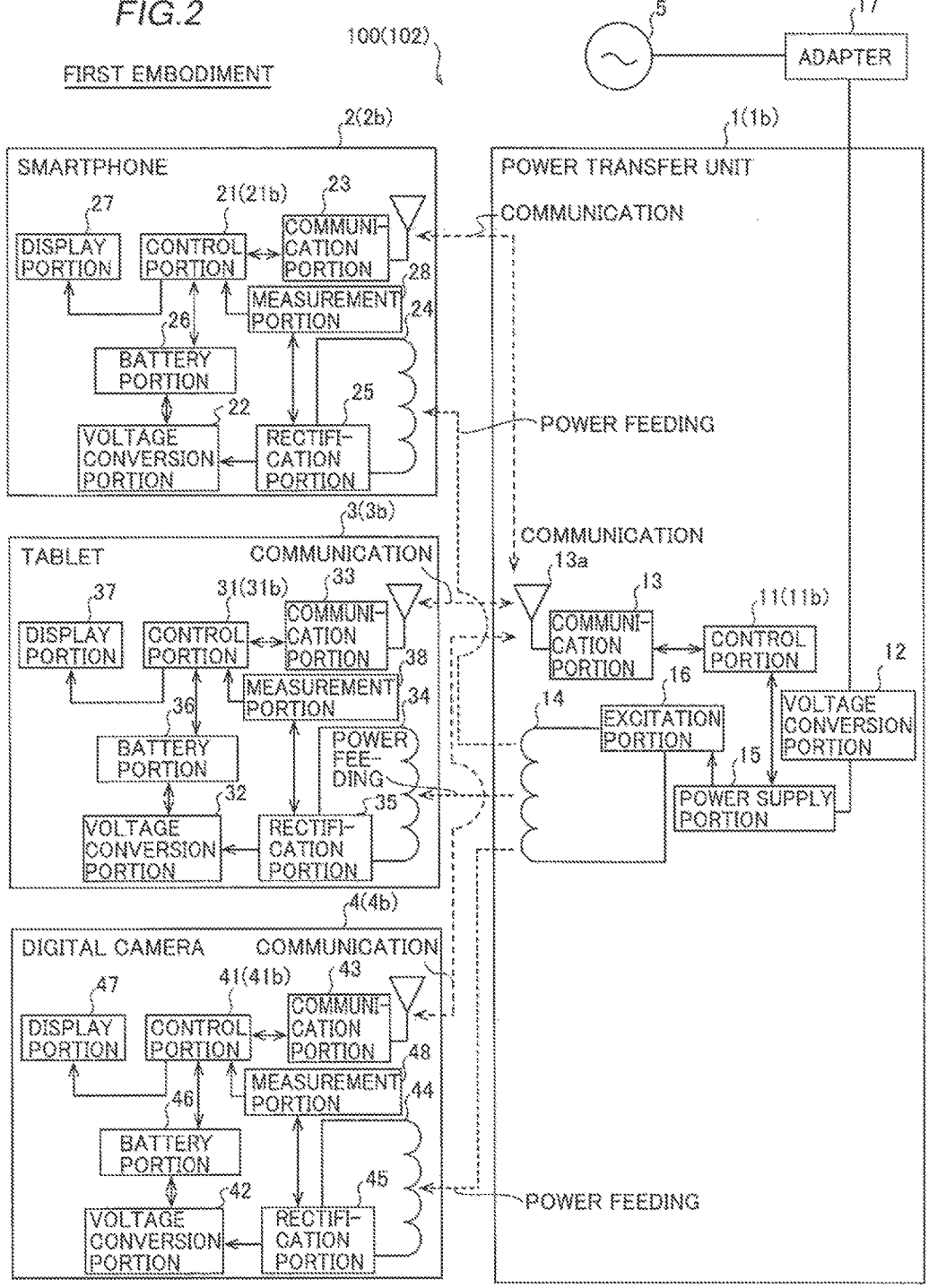
FIG. 2 is a block diagram showing the structure of the power transfer system according to the first embodiment of the present invention.

As shown in FIG. 2, the power transfer unit 1 includes a control portion 11, a voltage conversion portion 12, a communication portion 13, a feeding coil (power transfer coil) 14, a power supply portion 15, an excitation portion 16 and an adapter 17. The adapter 17 is configured to be connectable to a commercial power source 5 set outside the power transfer unit 1, for supplying power into the power transfer unit 1 through a cable. Further, the adapter 17 is configured to convert an AC voltage supplied from the commercial power source 5 to a DC voltage. The voltage conversion portion 12 is configured to convert the DC voltage converted by the adapter 17 to a constant voltage value, in order to supply the same to the power supply portion 15.

As shown in FIG. 2, the power supply portion 15, connected with the voltage conversion portion 12, including a variable voltage converter is configured to convert the voltage supplied from the voltage conversion portion 12 to a magnitude instructed by the control portion 11 including a CPU (Central Processing Unit) and the like. The excitation portion 16, including a driving circuit, a switching circuit, a resonance capacitor and the like, is connected to the feeding coil 14. The excitation portion 16 is configured to turn on/off the DC voltage converted by the power supply portion 15 at a resonance frequency of the feeding coil 14 and the resonance capacitor thereby feeding an AC current having a frequency corresponding to the resonance frequency to the feeding coil 14.

As shown in FIG. 2, the feeding coil 14 is configured to generate a feeding magnetic field (power transfer magnetic field) through the AC current flowing therein, and to supply the feeding magnetic field to the smartphone 2, the tablet 3 and the digital camera 4 arranged on the upper surface of the power transfer unit 1.

As shown in FIG. 2, the communication portion 13, including a radio antenna 13a, is configured to be capable of communicating with the smartphone 2, the tablet 3 and the digital camera 4 via a radio LAN (Local Area Network) through the radio antenna 13a. The communication portion 13 is an example of the "transmission portion" in the present invention.

As shown in FIG. 2, the smartphone 2 includes a control portion 21, a voltage conversion portion 22, a communication portion 23, a receiving coil 24, a rectification portion 25, a battery portion 26, a display portion 27 and a measurement portion 28. The receiving coil 24 is configured to generate an AC receiving voltage through the feeding magnetic field generated by the feeding coil 14 of the power transfer unit 1. The rectification portion 25, including a rectifying diode, a smoothing capacitor and the like, is configured to rectify the AC voltage received by the receiving coil 24 to a DC voltage. The voltage conversion portion 22 is configured to convert the rectified DC voltage to a constant DC voltage value suitable for charging the battery portion 27. The battery portion 26 includes a secondary battery and a charging information detection portion, and the charging information detection portion is configured to detect information (charging information) indicating whether or not the charging has been completed by measuring the voltage of the secondary battery etc. The battery portion 26 is an example of the "load" in the present invention. The communication portion 23 is an example of the "receiving portion" in the present invention.

As shown in FIG. 2, the measurement portion 28 of the smartphone 2 is configured to be capable of measuring the value of the DC voltage rectified by the rectification portion 25 (the value of the voltage received by the smartphone 2). The control portion 21, including a CPU and the like, is configured to acquire the detected charging information of the battery portion 26 and the measured value of the voltage received by the smartphone 2. According to the first embodiment, the control portion 21 of the smartphone 2 is configured to transmit proper voltage range information of the smartphone 2 previously stored in a memory included in the control portion 21 and the measured value of the voltage received by the smartphone 2 to the power transfer unit 1 through the communication portion 23 configured to be capable of communicating with the power transfer unit 1 via the radio LAN. The proper voltage ranges denote optimum voltage ranges defined according to A4WP standards. In other words, the proper voltage ranges are expressed as VRECT_MIN<VRECT<VRECT_MAX assuming that VRECT represents the value of the received voltage, VRECT_MIN represents the minimum operational voltage and VRECT_MAX represents the maximum operational voltage. In this specification, values of received voltages and proper voltage ranges described later are denoted by other signs, for the convenience of illustration.

Further, the control portion 21 is configured to acquire a posting signal for displaying a purport that the body of the smartphone 2 is to be moved through the communication portion 23. In addition, the control portion 21 is configured to control the display portion 27 to display the purport that the body of the smartphone 2 is to be moved when acquiring the posting signal therefor.

As shown in FIG. 2, the tablet 3 includes a control portion 31, a voltage conversion portion 32, a communication portion 33, a receiving coil 34, a rectification portion 35, a battery portion 36, a display portion 37 and a measurement portion 38. The control portion 31 of the tablet 3 is configured to transmit proper voltage range information of the tablet 3 previously stored in a memory included in the control portion 31 and a measured value of a voltage received by the receiving coil 34 to the power transfer unit 1 through the communication portion 33 configured to be capable of communicating with the power transfer unit 1 via the radio LAN. The voltage conversion portion 32, the receiving coil 34, the rectification portion 35, the battery portion 36, the display portion 37 and the measurement portion 38 are configured similarly to the voltage conversion portion 22, the receiving coil 24, the rectification portion 25, the battery portion 26, the display portion 27 and the measurement portion 28 of the smartphone 2 respectively, so that the tablet 3 is capable of receiving power fed by the power transfer unit 1. The communication portion 33 is an example of the "receiving portion" in the present invention.

As shown in FIG. 2, the digital camera 4 includes a control portion 41, a voltage conversion portion 42, a communication portion 43, a receiving coil 44, a rectification portion 45, a battery portion 46, a display portion 47 and a measurement portion 48. The control portion 41 of the digital camera 4 is configured to transmit proper voltage range information of the digital camera 4 previously stored in a memory included in the control portion 41 and a measured value of a voltage received by the receiving coil 44 to the power transfer unit 1 through the communication portion 43 configured to be capable of communicating with the power transfer unit 1 via the radio LAN. The voltage conversion portion 42, the receiving coil 44, the rectification portion 45, the battery portion 46, the display portion 47 and the measurement portion 48 are configured similarly to the voltage conversion portion 22, the receiving coil 24, the rectification portion 25, the battery portion 26, the display portion 27 and the measurement portion 28 of the smartphone 2 respectively, so that the digital camera 4 is capable of receiving power fed by the power transfer unit 1. The communication portion 43 is an example of the "receiving portion" in the present invention.

A method of acquiring first supply voltage ranges in the power transfer system 100 according to the first embodiment is now described with reference to FIG. 3.

Figure 3:
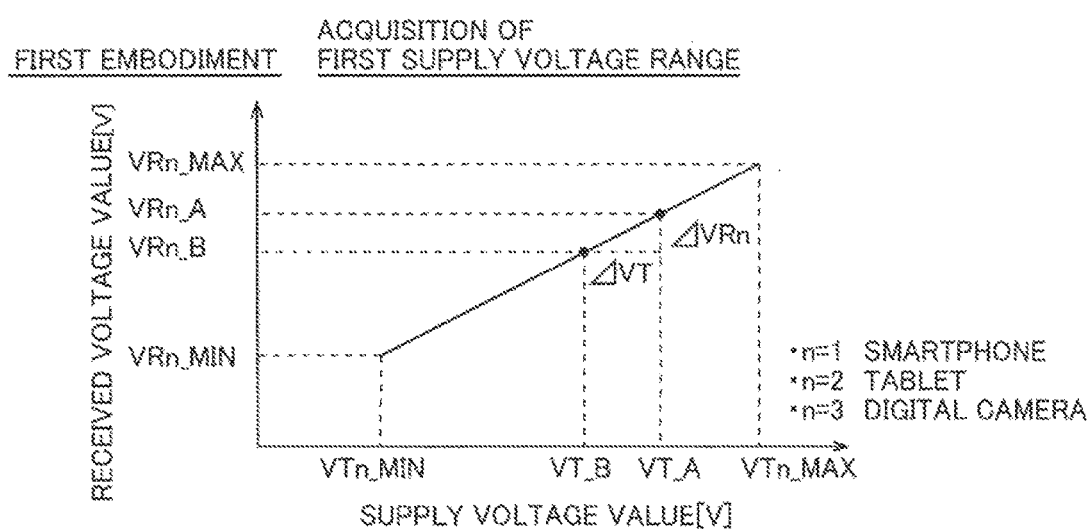
FIG. 3 is a diagram for illustrating acquisition of first supply voltage ranges (linear approximation) according to the first embodiment of the present invention.

As shown in FIG. 3, the control portion 11 of the power transfer unit 1 is configured to acquire the first supply voltage ranges for supply voltage values of the power supply portion 15 corresponding to the respective proper voltage ranges of the smartphone 2, the tablet 3 and the digital camera 4 on the basis of the acquired proper voltage range information and the acquired received voltage value information of the smartphone 2, the tablet 3 and the digital camera 4. More specifically, the smartphone 2, the tablet 3 and the digital camera 4 are configured to transmit the proper voltage range information (VRn_MIN and VRn_MAX, n=1 for the smartphone 2, n=2 for the tablet 3 and n=3 for the digital camera 4) to the power transfer unit 1 through the communication portions 23, 33 and 43 thereof respectively, as shown in FIG. 3. The control portion 11 of the power transfer unit 1 is configured to acquire the proper voltage range information through the communication portion 13. VRn_MIN is an approximate minimum value of a proper voltage, and VRn_MAX is an approximate maximum value of the proper voltage. In this specification, the approximate minimum value denotes a minimum value or a value close to the minimum value, and the approximate maximum value denotes a maximum value or a value close to the maximum value.

Further, the control portion 11 of the power transfer unit 1 is configured to supply the supply voltage of the value VT_A to the respective ones of the smartphone 2, the tablet 3 and the digital camera 4 through the feeding coil 14 and to thereafter supply a supply voltage of a value VT_B lower than the value VT_A thereto. The supply voltage values are set as VTn_A<VTn_B, whereby the values of the received voltages can be inhibited from exceeding the proper voltage ranges. The control portion 11 of the power transfer unit 1 is configured to transmit information purporting that the same has supplied the supply voltages of the values VT_A and VT_B (i.e., the control portion 11 has changed the supply voltage value) to the respective ones of the smartphone 2, the tablet 3 and the digital camera 4 through the communication portion 13.

As shown in FIGS. 2 and 3, the control portion 21 of the smartphone 2 is configured to acquire the information purporting that the control portion 11 has supplied the supply voltages of the values VT_A and VT_B thereto through the communication portion 23. Further, the control portion 21 of the smartphone 2 is configured to transmit information (received voltage change information) of received voltage values VR1_A and VR1_B corresponding to the acquired supply voltage values VT_A and VT_B to the power transfer unit 1 through the communication portion 23. The control portion 11 of the power transfer unit 1 is configured to acquire the information of the received voltage values VR1_A and VR1_B through the communication portion 13 and to calculate the first supply voltage range (VT1_MIN and VT1_MAX) of the smartphone 2 on the basis of the following equations (3) and (4). In the equations (3) and (4), it is assumed that $\Delta VRn = VRN\_A - VRn\_B$ and $\Delta VTn = VTn\_A - VTn\_N$.

$$VTn\_MIN = (VRn\_MIN - VRn\_A) \times \frac{\Delta VT}{\Delta VRn} + VT\_A \quad (3)$$

$$VTn\_MAX = (VRn\_MAX - VRn\_A) \times \frac{\Delta VT}{\Delta VRn} + VT\_A \quad (4)$$

Further, the control portion 11 of the power transfer unit 1 is configured to acquire respective first supply voltage ranges (VT2_MIN and VT2_MAX as well as VT3_MIN and VT3_MAX) of the tablet 3 and the digital camera 4 by methods similar to that for calculating the first supply voltage range of the smartphone 2.

A method of acquiring a second supply voltage range in the power transfer system 100 according to the first embodiment is now described with reference to FIGS. 4 and 5.

Figures 4, 5:
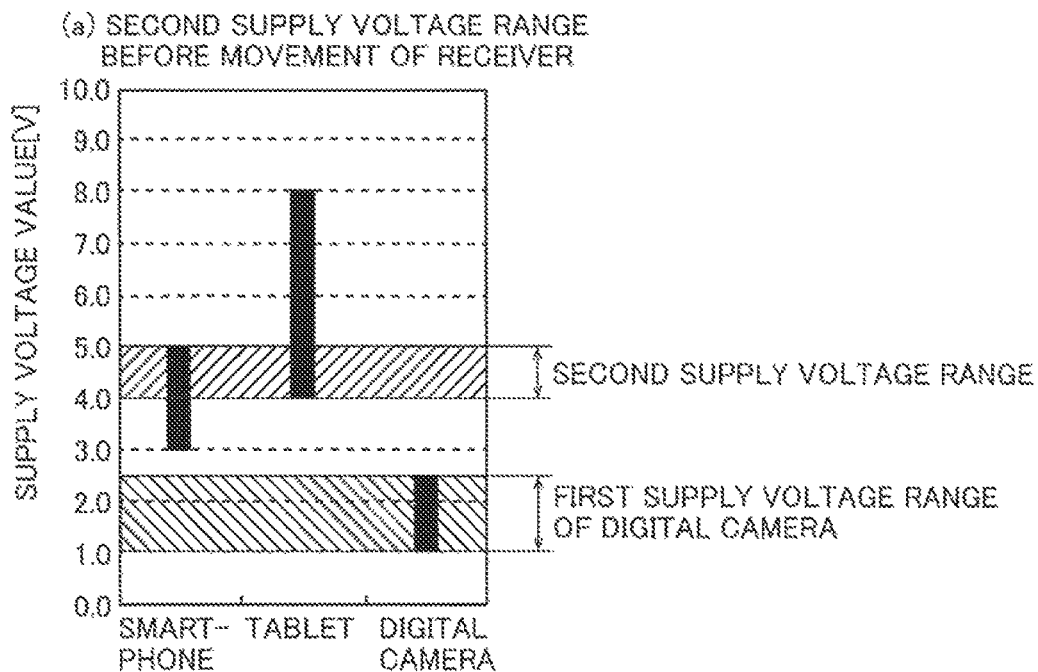
FIG. 4 shows a table for illustrating correspondence between proper voltage ranges and the first supply voltage ranges according to the first embodiment of the present invention.
FIG. 5 is a diagram for illustrating acquisition of a second supply voltage range according to the first embodiment of the present invention.

As shown in FIGS. 4 and 5, the control portion 11 of the power transfer unit 1 is configured to further acquire the second supply voltage range indicating the range of mutually overlapping supply voltages of the power supply portion 15 for the smartphone 2, the tablet 3 and the digital camera 4. As shown in FIGS. 4 and 5, the control portion 11 of the power transfer unit 1 is configured to compare the acquired first supply voltage ranges of the respective ones of the smartphone 2, the tablet 3 and the digital camera 4 with each other. When the first supply voltage ranges VT1_MIN and VT1_MAX, VT2_MIN and VT2_MAX and VT3_MIN and VT3_MAX of the smartphone 2, the tablet 3 and the digital camera 4 are 3.0 V and 5.0 V, 4.0 V and 8.0 V and 1.0 V and 2.5 V respectively, for example, the second supply voltage range is at least 4.0 V and not more than 5.0 V.

Transmission of a posting signal for making the display portion 27, 37 or 47 display a purport that the smartphone 2, the tablet 3 or the digital camera 4 is to be moved and supply voltage control in the power transfer system 100 according to the first embodiment are now described with reference to FIGS. 5 to 8.

When a receiver (the digital camera 4) whose first supply voltage range is outside the second voltage range is present, the control portion 11 of the power transfer unit 1 transmits a posting signal purporting that the position of the digital camera 4 is to be moved to the digital camera 4 through the communication portion 13. The receiver whose first supply voltage range is outside the second voltage range is an example of the "prescribed receiver" in the present invention.

The control portion 41 of the digital camera 4 acquires the posting signal purporting that the position thereof is to be changed and controls the display portion 47 to display the purport that the position of the body of the digital camera 4 is to be moved for the user. When the upper limit of the first supply voltage range of the digital camera 4 before movement is lower than the lower limit as shown in FIG. 5, for example, the control portion 41 of the digital camera 4 controls the display portion 47 to display a message prompting the user to separate the position of the body of the digital camera 4 from the feeding coil 14 of the power transfer unit 1.

Figure 6:
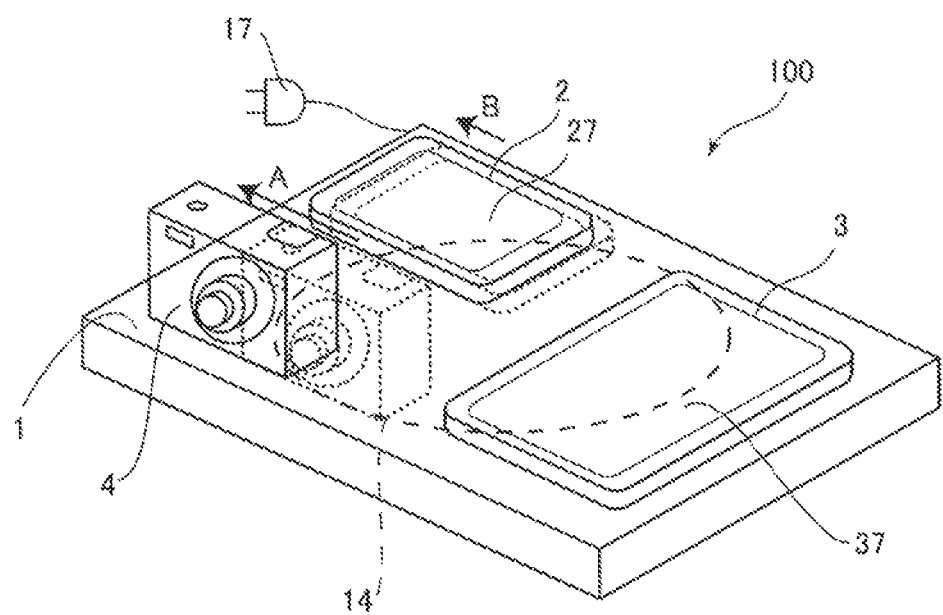
FIG. 6 is a diagram for illustrating movement of a receiver according to the first embodiment of the present invention.
Figure 7:
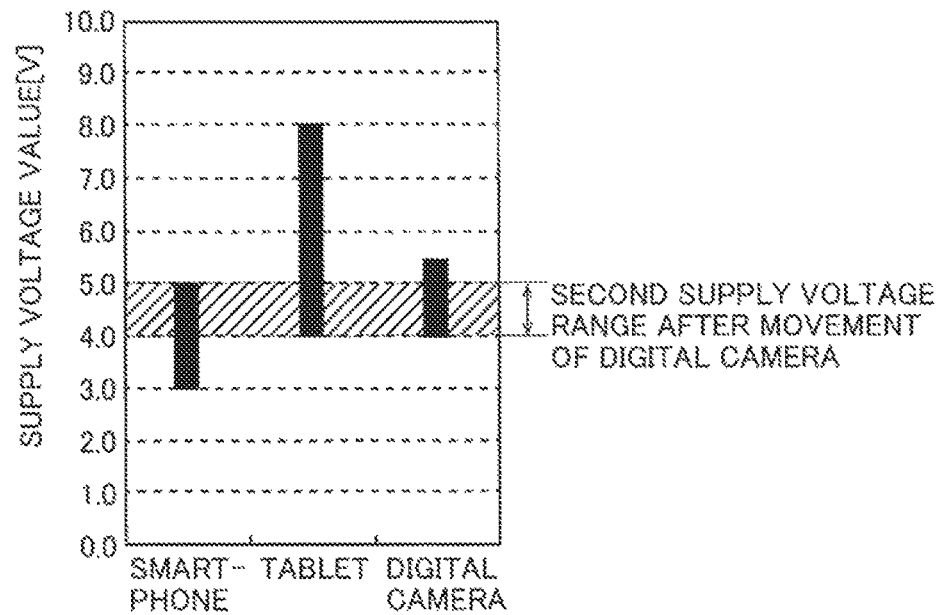
FIG. 7 is a diagram for illustrating the second supply voltage range after movement of a receiver outside the second supply voltage range according to the first embodiment of the present invention.

According to the first embodiment, the control portion 11 of the power transfer unit 1 is configured to repetitively acquire the first and second supply voltage ranges and to acquire the first voltage range (see FIG. 7) of the digital camera 4 changed due to the movement after the user has moved the digital camera 4 (along arrow A in FIG. 6), as shown in FIGS. 6 and 7.

Figure 8:
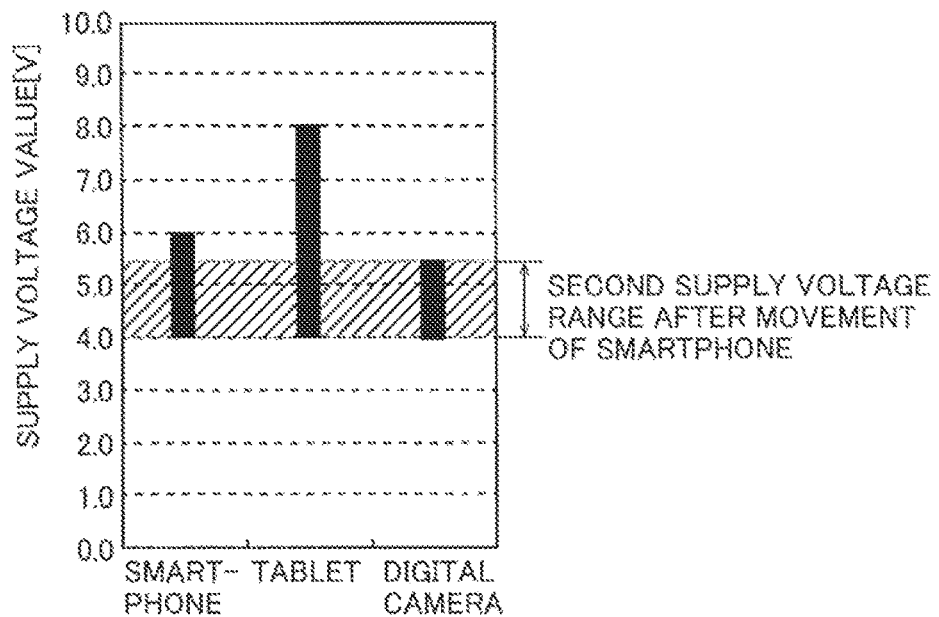
FIG. 8 is a diagram for illustrating the second supply voltage range after movement of a receiver inside the second supply voltage range according to the first embodiment of the present invention.

As shown in FIGS. 7 and 8, the control portion 11 of the power transfer unit 1 is configured to transmit a posting signal purporting that the position of any of the smartphone 2, the tablet 3 and the digital camera 4 is to be changed to the smartphone 2, the tablet 3 or the digital camera 4 through the communication portion 13 in order to enlarge the second supply voltage range on the basis of the result of the comparison of the first supply voltage ranges of the smartphone 2, the tablet 3 and the digital camera 4. When the upper limit (VT1_MAX) of the first supply voltage range of the smartphone 2 is lower than the upper limits (VT2_MAX and VT3_MAX) of the first supply voltage ranges of the tablet 3 and the digital camera 4 and the lower limit (VT1_MIN) of the former is lower than the lower limits (VT2_MIN and VT3_MIN) of the latter in the case of comparing the first supply voltage ranges of the smartphone 2, the tablet 3 and the digital camera 4 with each other as shown in FIG. 7, for example, the control portion 11 of the power transfer unit 1 transmits the posting signal purporting that the position of the smartphone 2 is to be changed to the smartphone 2 through the communication portion 13.

Then, the control portion 21 of the smartphone 2 acquires the posting signal purporting that the position thereof is to be changed, and controls the display portion 27 to display a message prompting the user to change the position of the body of the smartphone 2 on the basis of the acquired posting signal purporting that the position of the smartphone 2 is to be changed, as shown in FIG. 2. After the user moves the smartphone 2 (along arrow B in FIG. 6) as shown in FIG. 6, the control portion 11 of the power transfer unit 1 acquires the first supply voltage range (see FIG. 8) of the smartphone 2 changed by the movement. Thus, the control portion 11 can enlarge the second supply voltage range from the lower and upper limits of 4.0 V and 5.0 V before the movement of the smartphone 2 to lower and upper limits 4.0 V and 5.5 V after the movement of the smartphone 2.

The control portion 11 of the power transfer unit 1 controls the power supply portion 15 so that the supply voltage value is within the acquired second supply voltage range. When the lower and upper limits of the second supply voltage range are 4.0 V and 5.5 V respectively, for example, the control portion 11 of the power transfer unit 1 controls the power supply portion 15 to set the supply voltage value to 4.75 V, i.e., the central value between the lower and upper limits of 4.0 V and 5.5 V. Then, the control portion 11 supplies the supply voltage of 4.75 V of the power supply portion 15 to the smartphone 2, the tablet 3 and the digital camera 4, thereby simultaneously feeding (transferring) power to the smartphone 2, the tablet 3 and the digital camera 4.

The overall feeding (power transfer) control processing flow in the power transfer system 100 according to the first embodiment is now described with reference to FIG. 9. The control portion 11 performs the processing in the power transfer unit 1.

Figure 9:
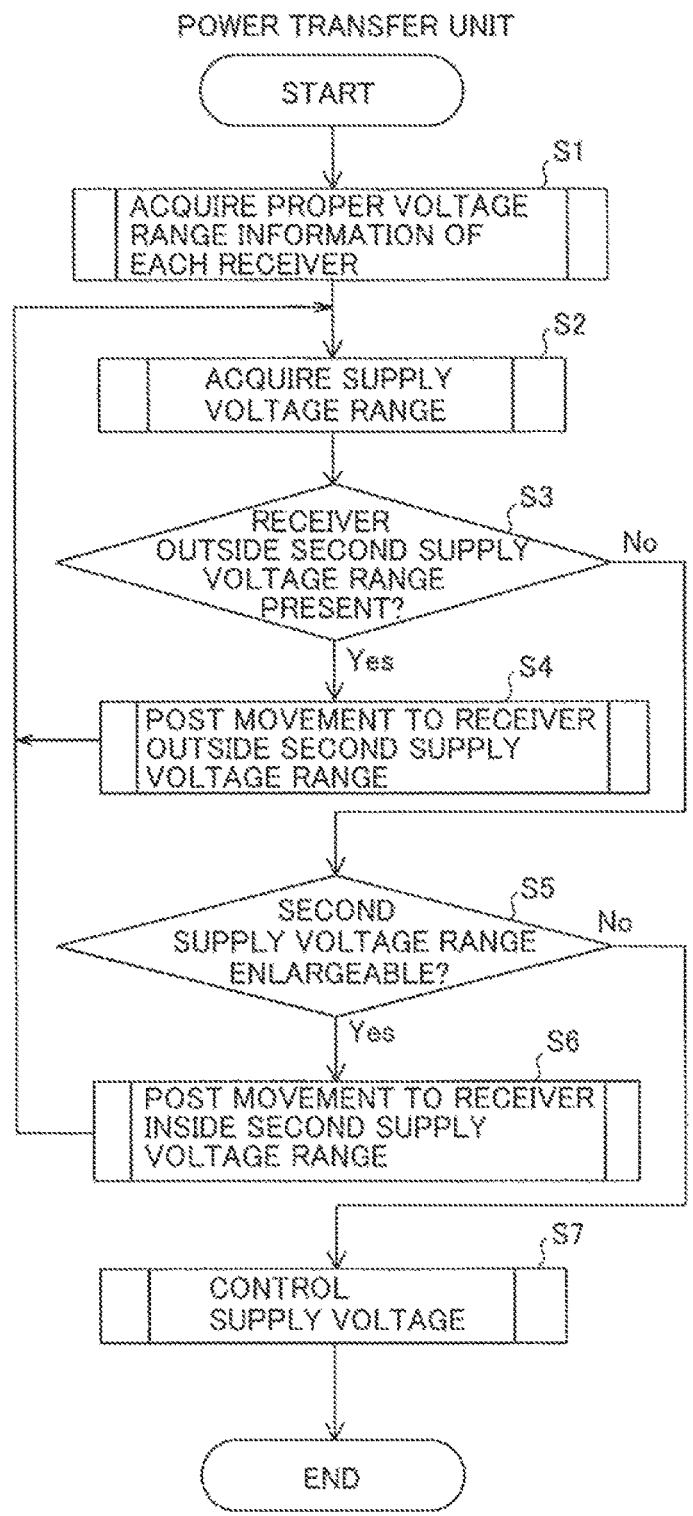
FIG. 9 is a flowchart for illustrating the overall feeding control processing in the power transfer system according to the first embodiment of the present invention.

First, the control portion 11 of the power transfer unit 1 acquires the proper voltage range information of each of the receivers (each of the smartphone 2, the tablet 3 and the digital camera 4) (see FIG. 10) described later at a step S1, as shown in FIG. 9. Thereafter the control portion 11 advances to a step S2, to acquire supply voltage ranges described later (see FIG. 1). Then, the control portion 11 advances to a step S3.

At the step S3, the control portion 11 determines whether or not any receiver outside the second supply voltage range is present. The control portion 11 advances to a step S4 if the receiver outside the second supply voltage range is present, or advances to a step S5 if no receiver outside the second supply voltage range is present. At the step S4, the control portion 11 performs movement posting processing for the receiver outside the second supply voltage range described later (see FIG. 12). Thereafter the control portion 11 returns to the step S2.

At the step S5, the control portion 11 determines whether or not the second supply voltage range is enlargeable. The control portion 11 advances to a step S6 when determining that the second supply voltage range is enlargeable, or advances to a step S7 when determining that the second supply voltage range is not enlargeable. At the step S6, the control portion 11 performs movement posting processing for the receiver outside the second supply voltage range described later (see FIG. 13). Thereafter the control portion 11 returns to the step S2.

Figure 12:
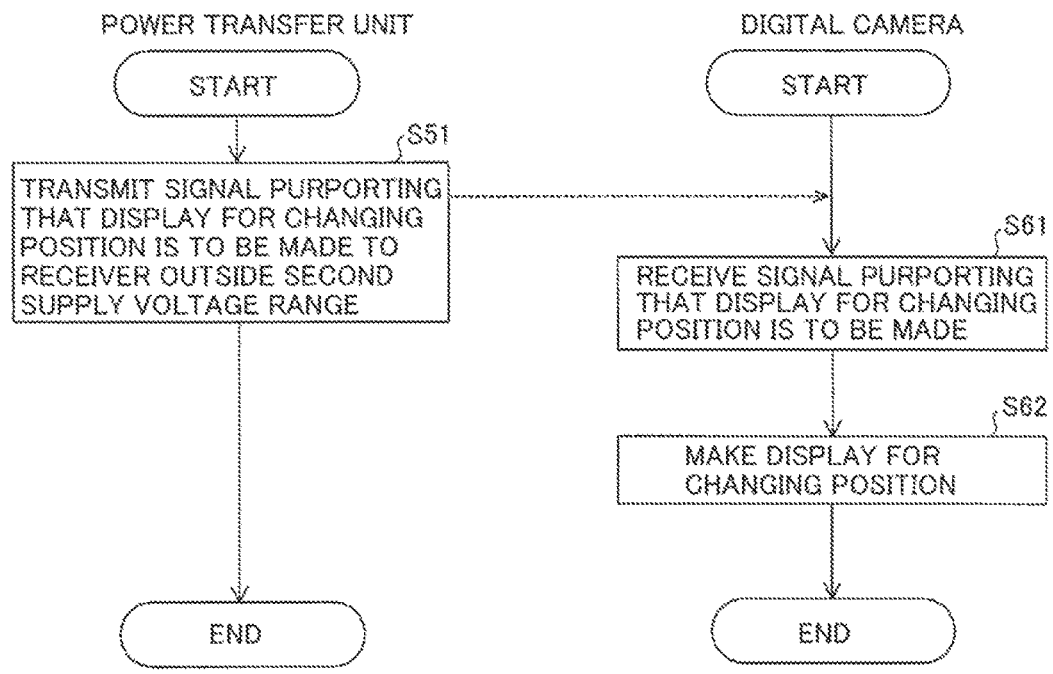
FIG. 12 is a flow chart for illustrating movement posting processing for the receiver outside the second supply voltage range in the power transfer system according to the first embodiment of the present invention.

At the step S7, the control portion 11 controls the supply voltage (see FIG. 12). Thereafter the control portion 11 terminates the overall feeding control processing flow.

The flow of processing for acquiring the proper voltage range information in the power transfer system 100 according to the first embodiment is now described with reference to FIG. 10. The control portions 11, 21, 31 and 41 perform processing in the power transfer unit 1, the smartphone 2, the tablet 3 and the digital camera 4 respectively.

Figure 10:
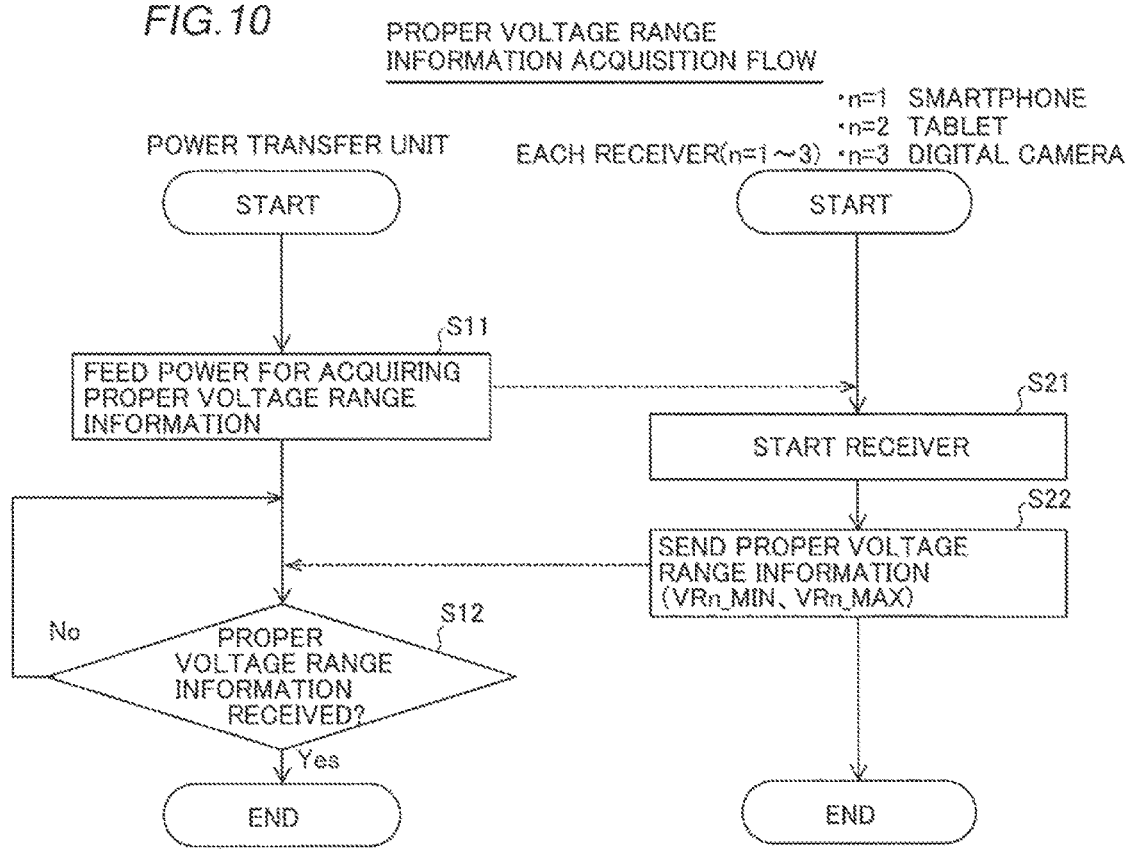
FIG. 10 is a flowchart for illustrating processing for acquiring proper voltage range information in the power transfer system according to the first embodiment of the present invention.

First, the control portion 11 of the power transfer unit 1 feeds power for acquiring the proper voltage range information to each of the smartphone 2, the tablet 3 and the digital camera 4 at a step S11, as shown in FIG. 10. Thereafter the control portion 11 advances to a step S12. At the step S12, the control portion 11 determines whether or not the same has received the proper voltage range information from each of the smartphone 2, the tablet 3 and the digital camera 4. The control portion 11 repeats this determination until the same receives the proper voltage range information, and terminates this proper voltage range information acquisition processing in the power transfer unit 1 when receiving the proper voltage range information.

On the other hand, each of the control portions 21, 31 and 41 starts each of the smart phone 2, the tablet 3 and the digital camera 4 at a step S21, as shown in FIG. 10. Thereafter each of the control portions 21, 31 and 41 advances to a step S22. At the step S22, each of the control portions 21, 31 and 41 sends the proper voltage range information (VRn_MIN and VRn_MAX) to the power transfer unit 1. Thereafter each of the control portions 21, 31 and 41 terminates the proper voltage range information acquisition processing flow in each of the smartphone 2, the tablet 3 and the digital camera 4.

A supply voltage range acquisition processing flow in the power transfer system 100 according to the first embodiment is now described with reference to FIG. 11. The control portions 11, 21, 31 and 41 perform processing in the power transfer unit 1, the smartphone 2, the tablet 3 and the digital camera 4 respectively.

First, the control portion 11 of the power transfer unit 1 feeds power to each of the smartphone 2, the tablet 3 and the digital camera 4 with the voltage of the initial set value (VT_A) at a step S31. Thereafter the control portion 11 advances to a step S32. At the step S32, the control portion 11 changes the supply voltage value. In other words, the control portion 11 of the power transfer unit 1 changes the value VT_A of the supply voltage of the power supply portion 15 to the value VT_B. Thereafter the control portion 11 advances to a step S33.

At the step S33, the control portion 11 transmits information purporting that the same has changed the supply voltage value to each of the smartphone 2, the tablet 3 and the digital camera 4. Thereafter the control portion 11 advances to a step S34.

At the step S34, the control portion 11 determines whether or not the same has received results of measurement of received voltage values from each of the smartphone 2, the tablet 3 and the digital camera 4. The control portion 11 advances to a step S35 when the same has received the results of measurement of the received voltage values, or returns to the step S33 when the same has received no results of measurement of the received voltage values. At the step S35, the control portion 11 acquires the first and second supply voltage ranges on the basis of the aforementioned methods of acquiring the first and second supply voltage ranges. Thereafter the control portion 11 terminates the supply voltage range acquisition flow in the power transfer unit 1.

Figure 11:
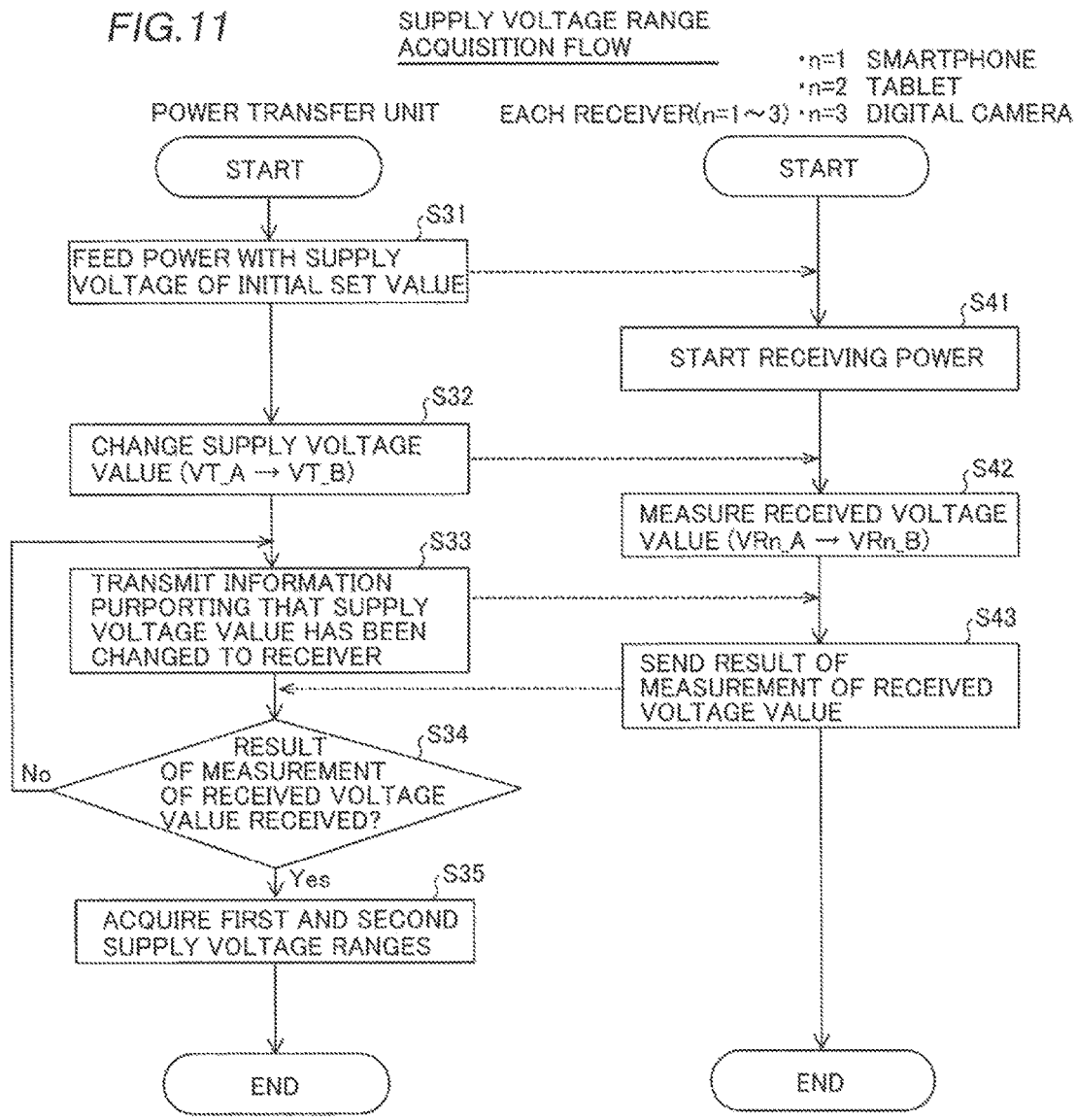
FIG. 11 is a flowchart for illustrating processing for acquiring the supply voltage ranges in the power transfer system according to the first embodiment of the present invention.

On the other hand, each of the control portions 21, 31 and 41 starts receiving the supply voltage at the initial set value from the power transfer unit 1 at a step S41, as shown in FIG. 11. Thereafter each of the control portions 21, 31 and 41 advances to a step S42. At the step S42, each of the control portions 21, 31 and 41 measures the received voltage values. In other words, each of the control portions 21, 31 and 41 measures the received voltage values (VRn_A and VRn_B) corresponding to the change (from VT_A to VT_N) in the supply voltage from the power transfer unit 1. Thereafter each of the control portions 21, 31 and 41 advances to a step S43. At the step S43, each of the control portions 21, 31 and 41 sends the measurement result (VRn_A and VRn_B) of each of the smartphone 2, the tablet 3 and the digital camera 4 to the power transfer unit 1. Thereafter each of the control portions 21, 31 and 41 terminates the supply voltage range acquisition flow in each of the smartphone 2, the tablet 3 and the digital camera 4.

A movement posting processing flow for a receiver outside the second supply voltage range in the power transfer system 100 according to the first embodiment is now described with reference to FIG. 12. The control portions 11 and 41 perform processing in the power transfer unit 1 and the digital camera 4 respectively.

As shown in FIG. 12, the control portion 11 of the power transfer unit 1 transmits a signal purporting that a display for changing the position is to be made to the receiver (the digital camera 4) outside the second supply voltage at a step S51.

In the receiver (the digital camera 4) outside the second supply voltage, on the other hand, the control portion 41 receives the signal purporting that a display for changing the position is to be made at a step S61, as shown in FIG. 12. Thereafter the control portion 41 advances to a step S62. At the step S62, the control portion 41 controls the display portion 47 of the digital camera 4 to make a display for changing the position. Thereafter the control portions 11 and 41 of the power transfer unit 1 and the digital camera 4 terminate the movement posting processing flow in the power transfer system 100.

A movement posting processing flow for a receiver inside the second supply voltage range in the power transfer system 100 according to the first embodiment is now described with reference to FIG. 13. The control portions 11 and 21 perform processing in the power transfer unit 1 and the smartphone 2 respectively.

Figure 13:
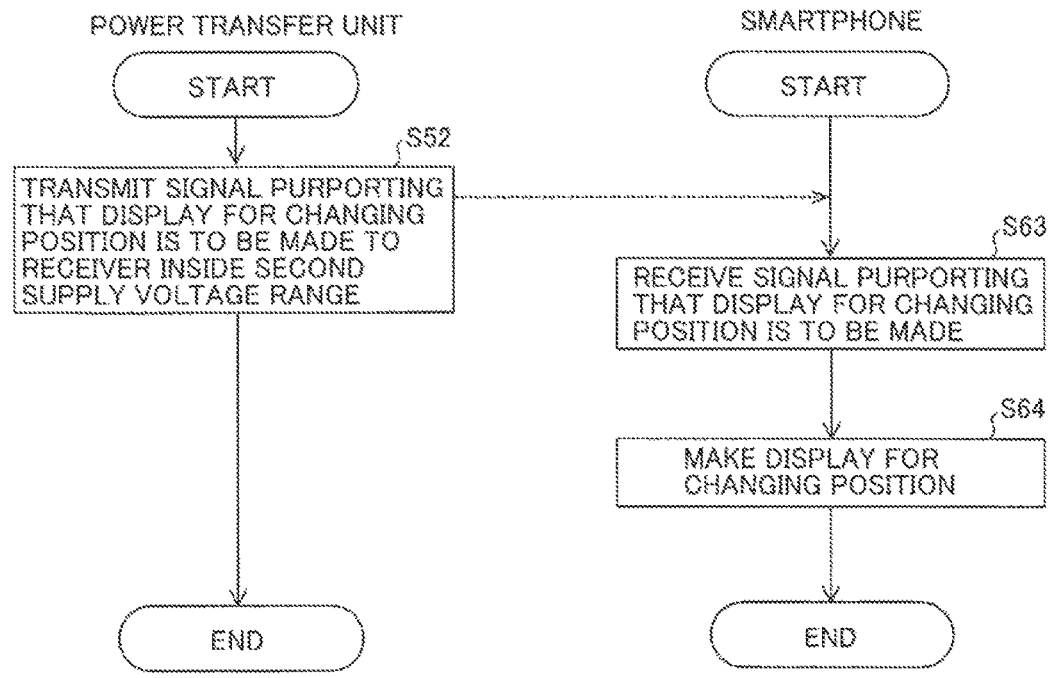
FIG. 13 is a flowchart for illustrating movement posting processing for the receiver inside the second supply voltage range in the power transfer system according to the first embodiment of the present invention.

As shown in FIG. 13, the control portion 11 of the power transfer unit 1 transmits a signal purporting that a display for changing the position is to be made to the receiver (the smartphone 2) inside the second supply voltage range at a step 52.

In the receiver (the smartphone 2) inside the second supply voltage range, on the other hand, the control portion 21 receives the signal purporting that a display for changing the position is to be made at a step S63, as shown in FIG. 13. Thereafter the control portion 21 advances to a step S64. At the step S64, the control portion 21 controls the display portion 27 of the smartphone 2 to make a display for changing the position. Thereafter the control portions 11 and 21 terminate the movement posting processing flow for the receiver inside the second supply voltage range in the power transfer system 100.

A supply voltage control processing flow in the power transfer system 100 according to the first embodiment is now described with reference to FIG. 14. The control portions 11, 21, 31 and 41 perform processing in the power transfer unit 1, the smartphone 2, the tablet 3 and the digital camera 4 respectively.

Figure 14:
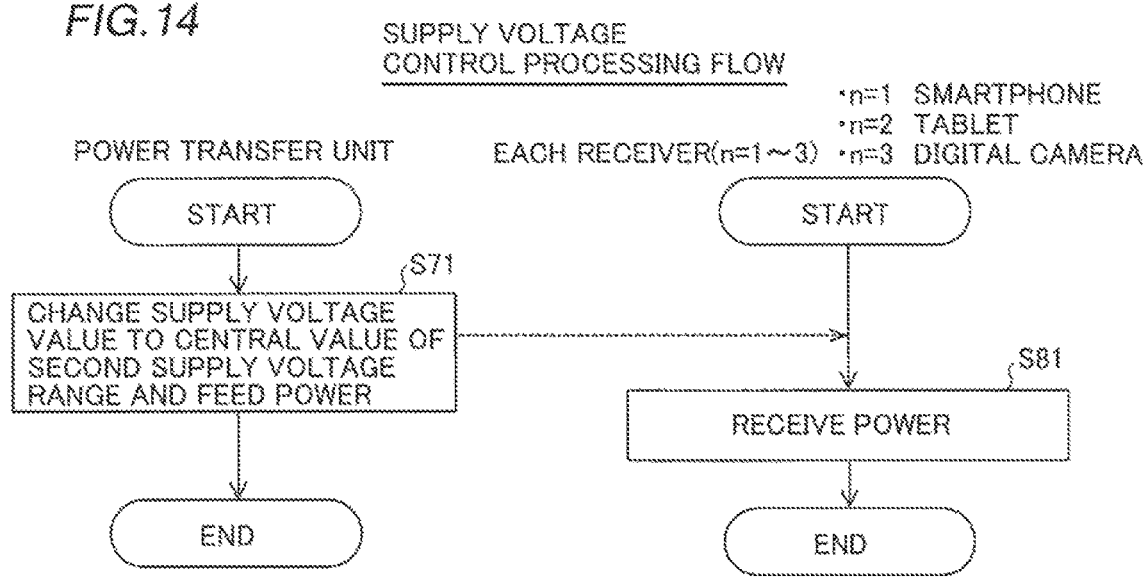
FIG. 14 is a flowchart for illustrating supply voltage control processing in the power transfer system according to the first embodiment of the present invention.

As shown in FIG. 14, the control portion 11 of the power transfer unit 1 changes the supply voltage of the power supply portion 15 to the central value in the second supply voltage range and feeds power to each of the smartphone 2, the tablet 3 and the digital camera 4 at a step S71.

On the other hand, each of the smartphone 2, the tablet 3 and the digital camera 4 receives the power supplied from the power transfer unit 1 at a step S81, as shown in FIG. 14. Thereafter each of the control portions 11, 21, 31 and 41 terminates the supply voltage control processing flow in the power transfer system 100.

According to the first embodiment, the following effects can be attained:

According to the first embodiment, as hereinabove described, the control portion 11 of the power transfer unit 1 is configured to acquire the proper voltage ranges of the smartphone 2, the tablet 3 and the digital camera 4 and to set the supply voltage value in the common range among the proper voltage ranges of the smartphone 2, the tablet 3 and the digital camera 4, whereby the power transfer unit 1 can feed power in the ranges (proper voltage ranges) of received voltage values allowed by the smartphone 2, the tablet 3 and the digital camera 4. Consequently, the power transfer unit 1 can suppress occurrence of a malfunction or the like also when simultaneously feeding power to the smartphone 2, the tablet 3 and the digital camera 4.

According to the first embodiment, as hereinabove described, the control portion 11 of the power transfer unit 1 is configured to supply power to the smartphone 2, the tablet 3 and the digital camera 4 at more than one supply voltage value, to acquire the received voltage value information of the smartphone 2, the tablet 3 and the digital camera 4 and to set the supply voltage value on the basis of the acquired received voltage value information. Thus, the control portion 11 can acquire the range of the supply voltage value of the power supply portion 15 corresponding to the proper voltage ranges of the smartphone 2, the tablet 3 and the digital camera 4, whereby the same can easily set the supply voltage value of the power supply portion 15 in the common range among the proper voltage values of the smartphone 2, the tablet 3 and the digital camera 4.

According to the first embodiment, as hereinabove described, the control portion 11 of the power transfer unit 1 is configured to supply power to the smartphone 2, the tablet 3 and the digital camera 4 at the prescribed supply voltage value (VT_A) and supply power to the smartphone 2, the tablet 3 and the digital camera 4 at the supply voltage value (VT_B) different from the prescribed supply voltage value to acquire the received voltage value information. Thus, the range (first supply voltage range) of the supply voltage value of the power supply portion 15 corresponding to the proper voltage ranges of the smartphone 2, the tablet 3 and the digital camera 4 can be easily acquired.

According to the first embodiment, as hereinabove described, the control portion 11 of the power transfer unit 1 is configured to change the supply voltage value of the power supply portion 15 from VT_A to VT_B by ΔVT, to acquire the approximate minimum and maximum values VRn_MIN and VRn_MAX of the proper voltage values and the received voltage values VRn_A and VRn_B fed with power with the supply voltage value and to calculate the approximate minimum and maximum values VTn_MIN and VTn_MAX of the supply voltage value through the above equations (3) and (4) assuming that ΔVRn represents the difference between the received voltage values VRn_A and VRn_B. Thus, the control portion 11 can easily acquire the range (first supply voltage range) of the supply voltage value of the power supply portion 15 corresponding to the proper voltage ranges of the smartphone 2, the tablet 3 and the digital camera 4 through the above equations (3) and (4).

According to the first embodiment, as hereinabove described, the control portion 11 of the power transfer unit 1 is configured to acquire the respective first supply voltage ranges corresponding to the proper voltage ranges of the receivers (the smartphone 2, the tablet 3 and the digital camera 4) for the respective receivers (the smartphone 2, the tablet 3 and the digital camera 4) and to set the supply voltage value in the second supply voltage range, i.e., the common range among the first supply voltage ranges. Thus, the control portion 11 can simultaneously feed power to all receivers having the proper voltage values in the second supply voltage range by controlling the supply voltage value of the power supply portion 15 to be in the acquired second supply voltage range.

According to the first embodiment, as hereinabove described, the power transfer unit 1 further includes the communication portion 13 transmitting the posting signal purporting that the position is to be changed to the receiver (the digital camera 4) outside the second supply voltage range. Thus, the receiver (the digital camera 4) outside the second supply voltage range can post the purport that the position is to be changed to the user. When the user moves the receiver (the digital camera 4) outside the second supply voltage range to a position in the second supply voltage range, the power transfer unit 1 can simultaneously feed power to a larger number of receivers (the smartphone 2, the tablet 3 and the digital camera 4) due to the movement of the receiver (the digital camera 4) outside the second supply voltage range to the position in the second supply voltage range.

According to the first embodiment, as hereinabove described, the power transfer unit 1 further includes the communication portion 13 transmitting the posting signal purporting that the position is to be changed to at least one receiver (the smartphone 2, for example) on the basis of the upper and lower limits in the first supply voltage ranges of the smartphone 2, the tablet 3 and the digital camera 4, in order to enlarge the second supply voltage range. Thus, the second supply voltage range can be so enlarged that the power transfer unit 1 can be inhibited from feeding power in excess of the proper voltage ranges even if the supply voltage value temporarily fluctuates, for example, due to the enlarged second supply voltage range.

According to the first embodiment, as hereinabove described, the control portion 11 of the power transfer unit 1 is configured to acquire the range of the supply voltage value through linear approximation on the basis of the received voltage value information. Thus, the control portion 11 can easily acquire the range of the supply voltage value, whereby the same can control the supply voltage value of the power supply portion 15 to satisfy the proper voltage values of the plurality of receivers (the smartphone 2, the tablet 3 and the digital camera 4) (in the common range of the proper voltage values).

According to the first embodiment, as hereinabove described, the control portion 11 of the power transfer unit 1 is configured to set the supply voltage value to the central value in the common range (second supply voltage range) among the proper voltage ranges of the smartphone 2, the tablet 3 and the digital camera 4. Thus, the power transfer unit 1 can be inhibited from feeding power with a voltage out of the proper voltage ranges even if the supply voltage value temporarily fluctuates, for example.

Second Embodiment

The structure of a power transfer system 101 according to a second embodiment of the present invention is now described with reference to FIGS. 15 and 16. According to the second embodiment, receivers (a smartphone, a tablet and a digital camera) are further provided with switches between receiving coils and battery portions which are examples of loads.

Figure 15:
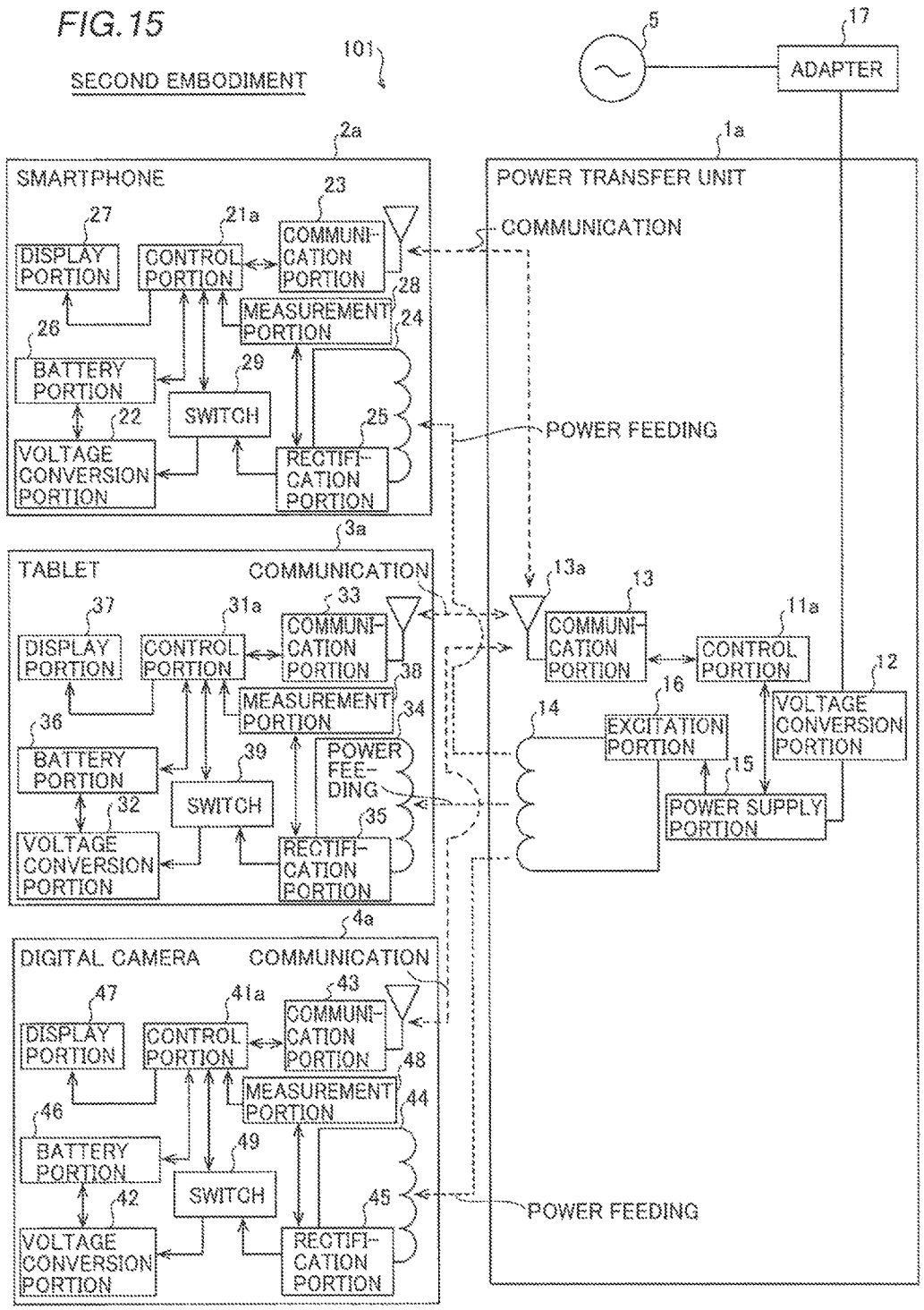
FIG. 15 illustrates the overall structure of a power transfer system according to a second embodiment of the present invention.

More specifically, the power transfer system 101 includes a power transfer unit 1a, a smartphone 2a, a tablet 3a and a digital camera 4a, as shown in FIG. 15. The power transfer unit 1a includes a control portion 11a, while the smartphone 2a includes a control portion 21a and a switch 29, the tablet 3a includes a control portion 31a and a switch 39, and the digital camera 4a includes a control portion 41a and a switch 49.

As shown in FIG. 15, the switch 29 of the smartphone 2a is provided between a rectification portion 25 and a voltage conversion portion 22, and configured to be switchable between connected and disconnected states under the control of the control portion 21a. Further, the switch 29 is so switched between the connected and disconnected states as to be switched from a state transmitting a current from the rectification portion 25 to the voltage conversion portion 22 and a battery portion 26 serving as a load to a state not transmitting the current. The switches 39 and 49 of the tablet 3a and the digital camera 4a are configured similarly to the switch 29 of the smartphone 2a.

Figure 16:
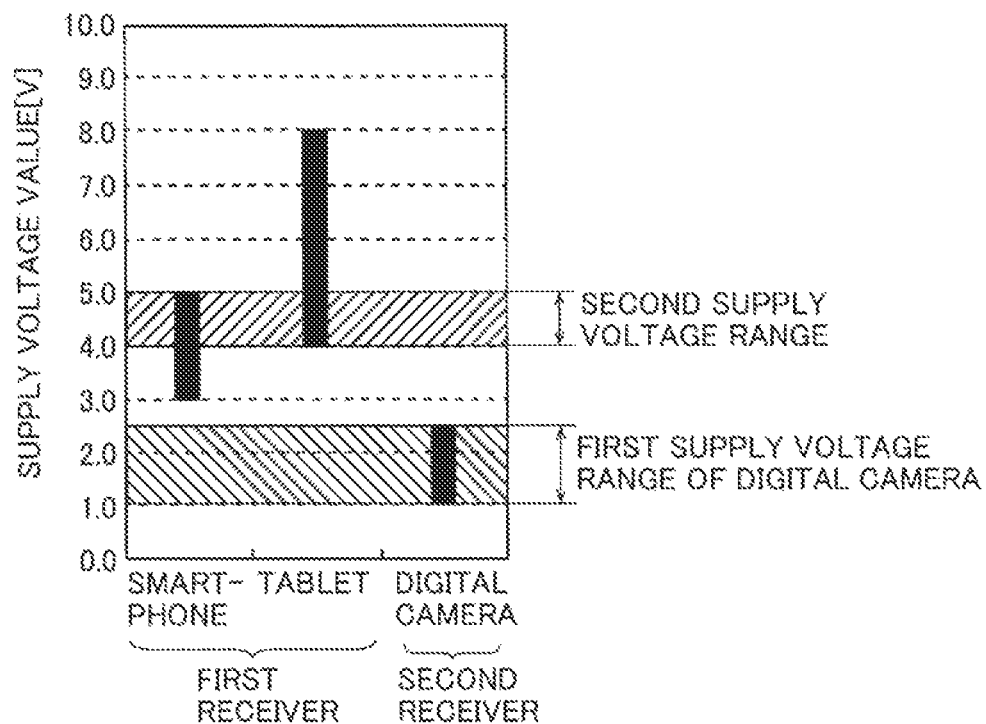
FIG. 16 is a graph for illustrating a method of determining receivers (first receivers) inside a second supply voltage range and a receiver (second receiver) outside the second supply voltage range in the power transfer system according to the second embodiment of the present invention.

According to the second embodiment, the control portion 11a of the power transfer unit 1a is configured to feed power to first receivers (the smartphone 2a and the tablet 3a, for example) whose first supply voltage ranges are inside a second supply voltage range and to transmit a load disconnection signal for disconnecting a load of a second receiver (the digital camera 4a, for example) whose first supply voltage range is outside the second supply voltage range to the second receiver (the digital camera 4a) through a communication portion 13, as shown in FIG. 16. The load disconnection signal is an example of the "signal purporting that power receiving is to be stopped" in the present invention.

More specifically, the control portion 11a of the power transfer unit 1a is configured to acquire the aforementioned second supply range and to thereafter determine the first receivers (the smartphone 2a and the tablet 3a) whose first supply voltage ranges are inside the second supply voltage range and the second receiver (the digital camera 4a) whose first supply voltage range is outside the second supply voltage range, as shown in FIGS. 15 and 16.

As shown in FIG. 16, the control portion 11a is configured to transmit load connection signals for connecting loads of the first receivers (the smartphone 2a and the tablet 3a) whose first supply voltage ranges are inside the second supply voltage range through the communication portion 13. The control portions 21a and 31a of the first receivers (the smartphone 2a and the tablet 3a) are configured to acquire the load connection signals through communication portions 23 and 33 thereof and to bring the switches 29 and 39 into the connected states.

Further, the control portion 11a is configured to transmit the load disconnection signal for disconnecting the load of the second receiver (the digital camera 4a) whose first supply voltage range is outside the second supply voltage range to the second receiver (the digital camera 4a) through the communication portion 13. The control portion 41a of the second receiver (the digital camera 4a) is configured to acquire the load disconnection signal through a communication portion 43 thereof and to bring the switch 49 into the disconnected state.

The control portion 11a of the power transfer unit 1a is configured to start power feeding (power transfer) and to control the first receivers (the smartphone 2a and the tablet 3a) whose switches 29 and 39 are in the connected states to receive the power. Further, the control portion 11a is configured to control the second receiver (the digital camera 4a) whose switch 9 is in the disconnected state not to receive the power.

According to the second embodiment, the control portion 11a of the power transfer unit 1a transmits the load disconnection signal for disconnecting the load of the second receiver (the digital camera 4a) through the communication portion 13, thereafter feeds power to the first receivers (the smartphone 2a and the tablet 3a), and transmits load disconnection signals for disconnecting the loads of the first receivers (the smartphone 2a and the tablet 3a) to the first receivers (the smartphone 2a and the tablet 3a) through the communication portion 13 while transmitting a load connection signal for connecting the load to the second receiver (the digital camera 4a) when acquiring feeding (power transfer) termination information indicating termination of the feeding (power transfer), as shown in FIG. 16.

More specifically, the control portions 21a and 31a of the first receivers (the smartphone 2a and the tablet 3a) acquire charging information from the battery portions 26 and 36 when charging of the first receivers (the smartphone 2a and the tablet 3a) is terminated after the control portion 11a of the power transfer unit 1a starts feeding power to the first receivers (the smartphone 2a and the tablet 3a) whose switches 29 and 39 are in the connected states. Then, the control portions 21a and 31a of the first receivers (the smartphone 2a and the tablet 3a) transmit the feeding termination information to the power transfer unit 1a through the communication portions 23 and 33 on the basis of the acquired charging information.

When acquiring the feeding termination information transmitted from the first receivers (the smartphone 2a and the tablet 3a) through the communication portion 13, the control portion 11a of the power transfer unit 1a transmits the load disconnection signals for disconnecting the loads of the first receivers (the smartphone 2a and the tablet 3a) to the first receivers (the smartphone 2a and the tablet 3a) through the communication portion 13, while transmitting the load connection signal for connecting the load to the second receiver (the digital camera 4a) and feeding power to the same.

Then, the control portions 21a and 31a of the first receivers (the smartphone 2a and the tablet 3a) acquire the load disconnection signals through the communication portions 23 and 33 respectively, and bring the switches 29 and 39 into the disconnected states. On the other hand, the control portion 41a of the second receiver (the digital camera 4a) acquires the load connection signal through the communication portion 43, and brings the switch 49 into the connected state.

Then, the control portion 11a of the power transfer unit 1a starts feeding power, and controls the first receivers (the smartphone 2a and the tablet 3a) whose switches 29 and 39 are in the disconnected states not to receive the power. On the other hand, the control portion 11a controls the second receiver (the digital camera 4a) whose switch 49 is in the connected state to receive the power.

According to the second embodiment, the control portion 11a of the power transfer unit 1a is configured to alternately perform a control operation of transmitting the load disconnection signal(s) and a control operation of feeding power on the first receivers (the smartphone 2a and the tablet 3a) and the second receiver (the digital camera 4a) at a prescribed time interval, as shown in FIG. 16.

More specifically, the control portion 11a of the power transfer unit 1a starts feeding power to the first receivers (the smartphone 2a and the tablet 3a) whose switches 29 and 39 are in the connected states and thereafter transmits the load disconnection signal(s) and the load connection signal(s) alternately to the first receivers (the smartphone 2a and the tablet 3a) and the second receiver (the digital camera 4a) every prescribed time interval (time interval sufficiently short with respect to charging times for the respective ones of the receivers, preferably about 1 minute with respect to a charging time of one hour, for example). In other words, the control portion 11a feeds power alternately to the first receivers (the smartphone 2a and the tablet 3a) and the second receiver (the digital camera 4a). The remaining structures of the power transfer system 101 according to the second embodiment are similar to those of the power transfer system 100 according to the first embodiment.

An overall feeding control processing flow in the power transfer system 101 according to the second embodiment is now described with reference to FIG. 17. The control portion 11*a* performs the processing in the power transfer unit 1*a*.

First, the control portion 11*a* of the power transfer unit 1*a* acquires proper voltage range information of the receivers (the smartphone 2*a*, the tablet 3*a* and the digital camera 4*a*) at a step S100, as shown in FIG. 17 (see FIG. 10). Thereafter the control portion 11*a* advances to a step S101, to acquire supply voltage ranges (see FIG. 11). Then, the control portion 11*a* advances to a step S102. The control portion 11*a* acquires the proper voltage ranges and the supply voltage ranges at the steps S100 and S101 by methods similar to those for acquiring the proper voltage range information and the supply voltage ranges at the steps S1 and S2 in the first embodiment.

Then, the control portion 11*a* performs supply voltage control described later (see FIGS. 18 and 19) at the step S102. Thereafter the control portion 11*a* terminates the overall feeding control processing flow.

A supply voltage control processing flow in the power transfer system 101 according to the second embodiment is now described with reference to FIGS. 18 and 19. The control portions 11*a*, 21*a*, 31*a* and 41*a* perform the processing in the power transfer unit 1*a*, the smartphone 2*a*, the tablet 3*a* and the digital camera 4*a* respectively.

First, the control portion 11*a* of the power transfer unit 1*a* determines whether or not a receiver outside the second supply voltage range is present at a step S110, as shown in FIG. 18. The control portion 11*a* advances to a step S111 when the receiver outside the second supply voltage range is present, or advances to a step S112 when no receiver outside the second supply voltage range is present.

At the step S111, the control portion 11*a* transmits the load disconnection signal to the second receiver (the digital camera 4*a*). Thereafter the control portion 11*a* advances to the step S112. At the step S112, the control portion 11*a* transmits the load connection signals to the first receivers (the smartphone 2*a* and the tablet 3*a*). Thereafter the control portion 11*a* advances to a step S113.

At the step S113, the control portion 11*a* of the power transfer unit 1*a* changes a supply voltage value to a central value in the second supply voltage range and feeds power to the first receivers (the smartphone 2*a* and the tablet 3*a*). Thereafter the control portion 11*a* advances to a step S114. At the step S114, the control portion 11*a* determines whether or not the same has received feeding (power transfer) termination signals from the first receivers (the smartphone 2*a* and the tablet 3*a*). The control portion 11*a* advances to a step S115 when receiving the feeding termination signals, or advances to a step S116 (see FIG. 19) when receiving no feeding termination signals.

At the step S115, the control portion 11*a* determines whether or not a prescribed time has lapsed. The control portion 11*a* advances to the step S116 (see FIG. 19) when the prescribed time has lapsed, or returns to the step S113 when the prescribed time has not lapsed.

In each of the first receivers (the smartphone 2*a* and the tablet 3*a*), on the other hand, the control portion 21*a* or 31*a* determines whether or not the load connection signal has been received from the power transfer unit 1*a* at a step S130, as shown in FIG. 18. The control portion 21*a* or 31*a* advances to a step S131 when receiving the load connection signal, or advances to a step S135 (see FIG. 19) when receiving no load connection signal. At the step S131, the control portion 21*a* or 31*a* turns on the switch 29 or 39 to connect the rectification portion 25 or 35 and the voltage conversion portion 22 or 32 with each other. In other words, each of the first receivers (the smartphone 2*a* and the tablet 3*a*) enters a state capable of transmitting a voltage received by the receiving coil 24 or 34 to the battery portion 26 or 36. Thereafter the control portion 21*a* or 31*a* advances to a step S132.

At the step S132, the control portion 21*a* or 31*a* receives power from the power transfer unit 1*a*. Thereafter the control portion 21*a* or 31*a* advances to a step S133. At the step S133, the control portion 21*a* or 31*a* determines whether or not charging has terminated. The control portion 21*a* or 31*a* advances to a step S134 when the charging has terminated, or advances to a step S135 (see FIG. 19) when the charging has not yet terminated. At the step S134, the control portion 21*a* or 31*a* sends a feeding termination signal to the power transfer unit 1*a* through the communication portion 23 or 33. Thereafter the control portion 21*a* or 31*a* terminates the supply voltage control flow in each of the first receivers (the smartphone 2*a* and the tablet 3*a*).

The control portion 43 of the second receiver (the digital camera 4*a*) performs processing similar to that at the steps S130 to S134 in each of the first receivers (the smartphone 2*a* and the tablet 3*a*) at steps S130 to S134, as shown in FIG. 18.

Then, the control portion 11*a* of the power transfer unit 1*a* transmits load disconnection signals to the first receivers (the smartphone 2*a* and the tablet 3*a*) at the step S116 to which the same has advanced when receiving the feeding termination signals at the step S114 or determining that the prescribed time has lapsed at the step S115 (see FIG. 18). Thereafter the control portion 11*a* advances to a step S117.

At the step S117, the control portion 11*a* transmits a load connection signal to the second receiver (the digital camera 4*a*). Thereafter the control portion 11*a* advances to a step S118. At the step S118, the control portion 11*a* changes the supply voltage to a central value in the first supply voltage range of the second receiver (the digital camera 4*a*) and feeds power to the second receiver (the digital camera 4*a*). Thereafter the control portion 11*a* advances to a step S119.

At the step S119, the control portion 11*a* determines whether or not the same has received a feeding termination signal from the second receiver (the digital camera 4*a*). The control portion 11*a* returns to the step S111 (see FIG. 18) when receiving the feeding termination signal, or advances to a step S120 when receiving no feeding termination signal. At the step S120, the control portion 11*a* determines whether or not a prescribed time has lapsed. The control portion 11*a* returns to the step 111 (see FIG. 18) when the prescribed time has lapsed, or returns to the step S118 when the prescribed time has not lapsed.

In each of the first receivers (the smartphone 2*a* and the tablet 3*a*), on the other hand, the control portion 21*a* or 31*a* determines whether or not the same has received a load disconnection signal from the power transfer unit 1*a* at the step S135 to which the same has advanced when receiving no load connection signal at the step S130 or the charging has not yet terminated at the step S133 (see FIG. 18). The control portion 21*a* or 31*a* advances to a step S136 when receiving the load disconnection signal, or returns to the step S130 (see FIG. 18) when receiving no load disconnection signal.

The control portion 43 of the second receiver (the digital camera 4*a*) performs processing similar to that at the steps S135 and S136 in each of the first receivers (the smartphone 2*a* and the tablet 3*a*) at steps S135 and S136, as shown in FIG. 19.

According to the second embodiment, the following effects can be attained:

According to the second embodiment, as hereinabove described, the power transfer unit 1a further includes the communication portion 13 transmitting the load disconnection signal (signal purporting that power receiving is to be stopped) to the second receiver (the digital camera 4a) outside the second supply voltage range. Thus, the load of the second receiver (the digital camera 4a) whose first supply voltage range is outside the second supply voltage range is disconnected (power receiving is stopped), whereby the power transfer unit 1a is prevented from applying a supply voltage exceeding an proper voltage value to the load of the second receiver (the digital camera 4a). Consequently, the power transfer unit 1a can be reliably inhibited from feeding power exceeding the proper voltage value.

According to the second embodiment, as hereinabove described, the control portion 11a of the power transfer unit 1a is configured to transmit the load disconnection signals to the first receivers (the smartphone 2a and the tablet 3a) whose first supply voltage ranges are inside the second supply voltage range through the communication portion 13 on the basis of acquisition of feeding termination information and to feed power to the second receiver (the digital camera 4a) outside the second supply voltage range. Thus, the power transfer unit 1a can feed power also to the second receiver (the digital camera 4a) whose load has been disconnected in the range of the proper voltage value thereof.

According to the second embodiment, as hereinabove described, the control portion 11a of the power transfer unit 1a is configured to alternately perform the control operation of transmitting the load disconnection signal(s) and the control operation of feeding power on the first receivers (the smartphone 2a and the tablet 3a) inside the second supply voltage range and the second receiver (the digital camera 4a) outside the second supply voltage range at the prescribed time interval. Thus, the power transfer unit 1a can feed power alternately to the plurality of first receivers (the smartphone 2a and the tablet 3a) and the second receiver (the digital camera 4a) in the common range among the proper voltage ranges of the receivers (the smartphone 2a, the tablet 3a and the digital camera 4a), whereby the same can charge the plurality of first receivers (the smartphone 2a and the tablet 3a) and the second receiver (the digital camera 4a) to some extent also when a charging time is short. The remaining effects of the power transfer system 101 according to the second embodiment are similar to those of the power transfer system 100 according to the first embodiment.

Third Embodiment

The structure of a power transfer system 102 according to a third embodiment of the present invention is now described with reference to FIGS. 2 and 20. The power transfer system 102 according to the third embodiment is configured to acquire first supply voltage ranges by approximating quadratic functions of supply voltage values and received voltage values, dissimilarly to the power transfer system 100 according to the first embodiment configured to acquire the first supply voltage ranges by linearly approximating the supply voltage values and the received voltage values.

As shown in FIG. 2, the power transfer system 102 according to the third embodiment includes a power transfer unit 1b, a smartphone 2b, a tablet 3b and a digital camera 4b. The power transfer unit 1b, the smartphone 2b, the tablet 3b and the digital camera 4b include control portions 11b, 21b, 31b and 41b respectively.

According to the third embodiment, the control portion 11b of the power transfer unit 1b is configured to acquire received voltage values of receivers (the smartphone 2b, the tablet 3b and the digital camera 4b) before and after changing a supply voltage value of a power supply portion 15 in addition to proper voltage range information of the receivers (the smartphone 2b, the tablet 3b and the digital camera 4b), to acquire a range of the supply voltage value of the power supply portion 15 corresponding to proper voltage ranges of the receivers (the smartphone 2b, the tablet 3b and the digital camera 4b) through approximation to quadratic functions on the basis of the acquired proper voltage range information of the receivers (the smartphone 2b, the tablet 3b and the digital camera 4b) and the received voltage values of the plurality of receivers (the smartphone 2b, the tablet 3b and the digital camera 4b) and to control the supply voltage value of the power supply portion 15 to be in the acquired range of the supply voltage value of the power supply portion 15, as shown in FIG. 20.

More specifically, the control portion 11b of the power transfer unit 1b supplies a supply voltage of a value $VT\_A$ to each of the smartphone 2b, the tablet 3b and the digital camera 4b through a feeding coil 14, thereafter supplies a supply voltage of a value $VT\_B$ lower than the supply voltage value $VT\_A$ through the feeding coil 14, and further supplies a supply voltage of a value $VT\_C$ lower than the supply voltage value $VT\_B$, as shown in FIG. 20. Further, the control portion 11b of the power transfer unit 1b transmits information indicating that the same has supplied the supply voltages of the values $VT\_A$, $VT\_B$ and $VT\_C$ (i.e., the same has changed the supply voltage value) to each of the smartphone 2b, the tablet 3b and the digital camera 4b through a communication portion 13 respectively.

As shown in FIGS. 2 and 20, the control portion 21b of the smartphone 2b receives the information indicating that the control portion 11b has supplied the supply voltages of the values $VT\_A$, $VT\_B$ and $VT\_C$ thereto through a communication portion 23, as shown in FIGS. 2 and 20. Further, the control portion 21b of the smartphone 2b transmits information of received voltage values $VR1\_A$, $VR1\_B$ and $VR1\_C$ (change information about the received voltage values) corresponding to the acquired supply voltage values $VT\_A$, $VT\_B$ and $VT\_C$ to the power transfer unit 1b through the communication portion 23. Then, the control portion 11b of the power transfer unit 1b acquires the information of the received voltage values $VR1\_A$, $VR1\_B$ and $VR1\_C$ through the communication portion 13, obtains quadratic functions expressing the correlation between the supply voltage values and the received voltage values by approximation on the basis of the acquired information of the received voltage values $VR1\_A$, $VR1\_B$ and $VR1\_C$, and acquires a first supply voltage range ($VT1\_MIN$ to $VT1\_MAX$) corresponding to an proper voltage range of the smartphone 2b.

In addition, the control portion 11b of the power transfer unit 1b acquires first supply voltage ranges ($VT2\_MIN$ to $VT2\_MAX$ and $VT3\_MIN$ to $VT3\_MAX$) of the tablet 3b and the digital camera 4b by methods similar to that for acquiring the first supply voltage range of the smartphone 2b. The remaining structures of the power transfer system 102 according to the third embodiment are similar to those of the power transfer system 100 according to the first embodiment.

A supply voltage range acquisition processing flow in the power transfer system 102 according to the third embodiment is now described with reference to FIG. 21. The control portions 11b, 21b, 31b and 41b perform processing in the power transfer unit 1b, the smartphone 2b, the tablet 3b and the digital camera 4b respectively.

First, the control portion 11b of the power transfer unit 1b feeds power to each of the smartphone 2b, the tablet 3b and the digital camera 4b with the supply voltage of the initial set value (VT_A) at a step S200, as shown in FIG. 21. Thereafter the control portion 11b advances to a step S201.

At the step S201, the control portion 11b changes the supply voltage value. In other words, the control portion 11b of the power transfer unit 1b changes the supply voltage VT_A of the power supply portion 15 to the values VT_B and VT_C in this order. Thereafter the control portion 11b advances to a step S202.

At the step S202, the control portion 11b transmits information purporting that the supply voltage value has been changed to each of the smartphone 2b, the tablet 3b and the digital camera 4b. Thereafter the control portion 11b advances to a step S203. At the step S203, the control portion 11b determines whether or not the same has received results of measurement of the received voltage values from each of the smartphone 2b, the tablet 3b and the digital camera 4b. The control portion 11b advances to a step S204 when receiving the results of measurement of the received voltage values, or returns to the step S201 when receiving no results of measurement of the received voltage values. At the step S204, the control portion 11b acquires first and second supply voltage ranges on the basis of the aforementioned method of acquiring the first and second supply voltage ranges through quadratic function approximation. Thereafter the control portion 11b terminates the supply voltage range acquisition flow in the power transfer unit 1b.

On the other hand, each of the control portions 21b, 31b and 41b of the smartphone 2b, the tablet 3b and the digital camera 4b starts receiving power from the power transfer unit 1b at a step S211, as shown in FIG. 21. Thereafter the control portion 21b, 31b or 41b advances to a step S212. Then, the control portion 21b, 31b or 41b measures the received voltage values at the step S212. In other words, the control portion 21b, 31b or 41b measures the receive voltage values (VRn_A, VRn_B and VRn_C) corresponding to the change (from VT_A to VT_B and VT_C) in the supply voltage value of the power transfer unit 1b. Thereafter the control portion 21b, 31b or 41b advances to a step S213. At the step S213, the control portion 21b, 31b or 41b sends the results (VRn_A, VRn_B and VRn_C) of the measurement of the received voltage values in each of the smartphone 2b, the tablet 3b and the digital camera 4b to the power transfer unit 1b. Thereafter the control portion 21b, 31b or 41b terminates the supply voltage range acquisition flow in each of the smartphone 2b, the tablet 3b and the digital camera 4b.

According to the third embodiment, the following effects can be attained:

According to the third embodiment, as hereinabove described, the control portion 11b of the power transfer unit 1b is configured to acquire the range of the supply voltage through approximation to quadratic functions on the basis of the received voltage value information. Thus, the control portion 11b can easily acquire the range of the supply voltage, whereby the same can control the supply voltage value of the power supply portion 15 in a common range among proper voltage ranges of the plurality of receivers (the smartphone 2b, the tablet 3b and the digital camera 4b). The remaining effects of the power transfer system 102 according to the third embodiment are similar to those of the power transfer system 100 according to the first embodiment.

Fourth Embodiment

The structure of a power transfer system 103 according to a fourth embodiment of the present invention is now described with reference to FIGS. 22 and 23. The power transfer system 103 according to the fourth embodiment is configured to select any of a plurality of non-overlapping second supply voltage ranges (to perform feeding (power transfer) order set processing) on the basis of the order of arrangement of receivers on a power transfer unit 1c (power transfer unit body) and to feed power to a receiver corresponding to the selected second supply voltage range when the plurality of non-overlapping second supply voltage ranges are present.

As shown in FIG. 22, the power transfer system 103 according to the fourth embodiment includes the power transfer unit 1c, a smartphone 2a, a tablet 3a, a digital camera 4a and an electric toothbrush 6. The power transfer unit 1c includes a control portion 11c. The smartphone 2a, the tablet 3a and the digital camera 4a are configured similarly to the smartphone 2a, the tablet 3a and the digital camera 4a in the power transfer system 101 according to the second embodiment. In other words, the smartphone 2a, the tablet 3a and the digital camera 4a are provided with switches 29, 39 and 49 respectively. Thus, the smartphone 2a, the tablet 3a and the digital camera 4a are capable of controlling starting and stoppage of power receiving on the basis of load connection signals and load disconnection signals.

The electric toothbrush 6, including a control portion, a switch and the like therein, is capable of starting and stoppage of power receiving on the basis of a load connection signal and a load disconnection signal from the power transfer unit 1c. The electric toothbrush 6 is an example of the "receivers" in the present invention.

The feeding order set processing in the power transfer system 103 according to the fourth embodiment is now described.

The control portion 11c is configured to feed power to a receiver firstly arranged on the upper surface of the power transfer unit 1c when a plurality of non-overlapping second supply voltage ranges are present.

More specifically, the control portion 11c sets a supply voltage value to a central value in the second supply voltage range including the receiver firstly arranged on the upper surface of the power transfer unit 1c when the plurality of non-overlapping second supply voltage ranges are present. Then, the control portion 11c transmits load disconnection signals to receivers outside the second supply voltage range including the receiver firstly arranged on the upper surface of the power transfer unit 1c, and transmits load connection signals to receivers (including the firstly arranged receiver) inside the second supply voltage range. Thereafter the power transfer unit 1c starts feeding power to the receivers inside the second supply voltage range.

Referring to FIG. 22, for example, the smartphone 2a, the tablet 3a, the digital camera 4a and the electric toothbrush 6 are arranged on the power transfer unit 1c in this order. In this case, the control portion 11c of the power transfer unit 1c sets first and second supply voltage ranges of the respective receivers (the smartphone 2a, the tablet 3a, the digital camera 4a and the electric toothbrush 6), as shown in FIG. 23.

In this case, the control portion 11c sets three non-overlapping second supply voltage ranges, as shown in FIG. 23. Then, the control portion 11c sets the supply voltage value to the central value (4.5 V) in the second supply voltage range including the smartphone 2a firstly set on the power transfer unit 1c. Then, the control portion 11c transmits load disconnection signals to the digital camera 4a and the electric toothbrush 6, while transmitting load connection signals to the smartphone 2a and the tablet 3a. Thereafter the power transfer unit 1c starts feeding power to the smartphone 2a and the tablet 3a.

According to the fourth embodiment, the control portion 11c is configured to select any of the plurality of non-overlapping second supply voltages on the basis of the order or arrangement of the receivers on the power transfer unit 1c (body of the power transfer unit) and to feed power to the receiver corresponding to the selected second supply voltage range when the plurality of non-overlapping second supply voltage ranges are present.

More specifically, the control portion 11c is configured to feed power to a receiver arranged earlier and not yet fed with power among the receivers arranged on the power transfer unit 1c after terminating power feeding to the firstly arranged receiver.

In the case of the aforementioned example, the control portion 11c simultaneously feeds power to the smartphone 2a and the tablet 3a firstly and secondly arranged on the power transfer unit 1c respectively, since the smartphone 2a and the tablet 3a have the common second voltage range. When terminating the power feeding to the smartphone 2a and the tablet 3a, the control portion 11c selects the digital camera 4a arranged on the power transfer unit 1c earlier than the electric toothbrush 6 from the digital camera 4a and the electric toothbrush 6 not yet fed with power, and sets the supply voltage to the central value (1.75 V) in the second supply voltage range including the digital camera 4a.

Then, the control portion 11c transmits a load connection signal to the digital camera 4a, while transmitting load disconnection signals to the smartphone 2a, the tablet 3a and the electric toothbrush 6. Then, the power transfer unit 1c starts feeding power to the digital camera 4a.

After terminating the power feeding to the digital camera 4a, the control portion 11c feeds power to the electric toothbrush 6 not yet fed with power. The remaining structures of the power transfer system 103 according to the fourth embodiment are similar to those of the power transfer system 100 according to the first embodiment.

According to the fourth embodiment, the following effects can be attained:

According to the fourth embodiment, as hereinabove described, the control portion 11c is configured to feed power to a receiver on the basis of the order of arrangement of the receivers on the power transfer unit 1c when the plurality of non-overlapping second supply voltage ranges are present. According to this structure, the power transfer unit 1c feeds power to the receivers along the order corresponding to that along which the user has arranged the receivers on the body of the power transfer unit 1c, whereby the same can feed power to the receivers along the order intended by the user.

According to the fourth embodiment, as hereinabove described, the control portion 11c is configured to feed power to the receiver (the smartphone 2a in the above example) firstly arranged on the power transfer unit 1c when the plurality of non-overlapping second supply voltage ranges are present. When the user arranges a plurality of receivers on the power transfer unit 1c, the user conceivably intends to start power feeding from the firstly arranged receiver (the smartphone 2a in the above example). In consideration of this point, the power transfer unit 1c starts power feeding from the firstly arranged receiver, whereby the same can start power feeding from the receiver intended by the user. The remaining effects of the power transfer system 103 according to the fourth embodiment are similar to those of the power transfer system 100 according to the first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the smartphone, the tablet and the digital camera as the receivers in each of the first to third embodiments and to the smartphone, the tablet, the digital camera and the electric toothbrush as the receivers in the fourth embodiment, the present invention is not restricted to this. The present invention may alternatively be applied to a receiver other than the smartphone, the tablet, the digital camera and the electric toothbrush. For example, the present invention may be applied to a notebook computer or the like.

While the power transfer unit feeds power to three or four receivers in each of the first to fourth embodiments, the present invention is not restricted to this. According to the present invention, the power transfer unit may alternatively be configured to feed power to receivers of a number other than three or four. For example, the power transfer unit may be configured to feed power to two receivers, or to five or more receivers.

While the control portion acquires the first supply voltage ranges by linear approximation of the supply voltage value and the received voltage values or approximation to quadratic functions in each of the first to fourth embodiments, the present invention is not restricted to this. According to the present invention, the control portion may alternatively be configured to acquire the first supply voltage ranges by approximation to cubic or higher functions.

While the control portion sets the supply voltage value to the central value in the second supply voltage range and feeds power in each of the first to fourth embodiments, the present invention is not restricted to this. According to the present invention, the control portion may alternatively be configured to feed power with a second supply voltage at a value in the second supply voltage range other than the central value in the second supply voltage range. For example, a control portion 11d of a power transfer unit 1d according to a modification shown in FIG. 22 is configured to set a supply voltage value to a value (upper limit, for example) larger than a central value in the common range among proper voltage ranges of a plurality of receivers (second supply voltage range). Thus, the speed of power feeding can be increased as compared with the case where the supply voltage value is set to a central value.

While the power transfer unit includes one feeding coil in each of the first to fourth embodiments, the present invention is not restricted to this. According to the present invention, the power transfer unit may alternatively include a plurality of feeding coils. For example, four feeding coils may be arranged to surround one feeding coil (repeater system), so that the power transfer unit generates a feeding magnetic field of a resonance frequency with five feeding coils.

While the communication portions employ the radio LAN as communication means in each of the first to fourth embodiments, the present invention is not restricted to this. According to the present invention, the control portions may alternatively employ communication means other than the radio LAN. For example, the control portions may employ Bluetooth (registered trademark), specified low power radio or weak radio, for example.

While the control portion sets the supply voltage in the range of at least 0 V and not more than 10 V in each of the first to fourth embodiments, the present invention is not restricted to this. According to the present invention, the control portion may alternatively feed power with a supply voltage at a value larger than 10 V.

While the receiver is moved in a circumferentially outer direction with respect to the feeding coil upon the movement posting in the first embodiment, the present invention is not restricted to this. For example, a nonconductive substance may be inserted between the receiver and the feeding coil for spreading the interval therebetween in the height direction.

While the control portion is configured to switch the load disconnection signals and the load connection signals for the first and second receivers at the same prescribed time interval in the second embodiment, the present invention is not restricted to this. When the first receivers require larger power than the second receiver, for example, the control portion may alternatively be configured to transmit the load connection signals to the first receivers for a longer time than that for the load disconnection signals and to transmit the load disconnection signal to the second receiver for a longer time than that for the load connection signal.

While the processing of the control portion of the power transfer unit according to the present invention has been illustrated with reference to flow-driven type flowcharts for successively performing the processing along the processing flows in each of the first to fourth embodiments, the present invention is not restricted to this. According to the present invention, the control portion(s) may alternatively perform operations through event-driven processing for executing processing every event. In this case, the control portion(s) may perform operations through complete event-driven processing, or through a combination of event-driven processing and flow-driven processing.

While the control portion of the power transfer unit is configured to feed power to a next receiver after terminating power feeding to the first receiver on the basis of the order along which the user has arranged the receivers on the body of the power transfer unit in the fourth embodiment, the present invention not restricted to this. According to the present invention, the control portion may alternatively be configured to feed power to the next receiver also when the same has not yet terminated power feeding to the first receiver on the basis of the order along which the user has arranged the receivers on the body of the power transfer unit. For example, the second and fourth embodiments may be so combined with each other that the control portion switches the receivers (second supply voltage range) to be fed with power every prescribed time interval.

While the communication portion capable of bidirectional communication is employed as the transmission portion in each of the first to fourth embodiments, the present invention is not restricted to this. According to the present invention, a transmission portion other than the communication portion capable of bidirectional communication may be employed. For example, a transmission portion capable of unidirectionally transmitting information may be employed.

While the control portion employs the load disconnection signals as the signals purporting that power receiving is to be stopped in each of the second and fourth embodiments, the present invention is not restricted to this. According to the present invention, the control portion may alternatively employ signals other than the load disconnection signals as signals purporting that power receiving is to be stopped. In other words, the signals purporting that power receiving is to be stopped may simply be those making the receivers stop power receiving.

What is claimed is:

1. A power transfer unit comprising:
a power supply portion; and
a control portion controlling the power supply portion, wherein
the control portion acquires proper voltage ranges of a plurality of receivers, acquires respective first supply voltage ranges corresponding to the proper voltage ranges of the plurality of receivers for respective ones of the plurality of receivers and sets a supply voltage value in a second supply voltage range which is a mutually overlapping range of the first supply voltage ranges.

2. The power transfer unit according to claim 1, wherein the control portion supplies power to the receivers at more than one supply voltage value to acquire received voltage value information and sets the supply voltage value based on the received voltage value information which has been acquired.

3. The power transfer unit according to claim 2, wherein the control portion supplies power to the receivers at a prescribed supply voltage value and supplies power to the receivers at the supply voltage value different from the prescribed supply voltage value to acquire the received voltage value information.

4. The power transfer unit according to claim 3, wherein the control portion changes the supply voltage value of the power supply portion from VT_A to VT_B by ΔVT, to acquire approximate minimum values VRn_MIN and approximate maximum values VRn_MAX of proper voltage values of the plurality of receivers and received voltage values VRn_A and VRn_B of the plurality of receivers fed with power at the supply voltage value and calculates an approximate minimum value VTn_MIN and an approximate maximum value VTn_MAX of the supply voltage value through the following equations (1) and (2) assuming that ΔVRn represents the difference between the received voltage values VRn_A and VRn_B:

$$VTn\_MIN = (VRn\_MIN - VRn\_A) \times \frac{\Delta VT}{\Delta VRn} + VT\_A \quad (1)$$

$$VTn\_MAX = (VRn\_MAX - VRn\_A) \times \frac{\Delta VT}{\Delta VRn} + VT\_A. \quad (2)$$

5. The power transfer unit according to claim 1, wherein the control portion feeds power to the receivers based on the order of arrangement of the receivers on a body of the power transfer unit when a plurality of non-overlapping second voltage ranges are present.

6. The power transfer unit according to claim 1, wherein the control portion feeds power to a receiver firstly arranged on a body of the power transfer unit when a plurality of non-overlapping second supply voltage ranges are present.

7. The power transfer unit according to claim 1, further comprising a transmission portion transmitting a posting signal purporting that a position of a prescribed receiver is to be changed to the prescribed receiver.

8. The power transfer unit according to claim 1, further comprising a transmission portion transmitting a posting signal purporting that a position of at least one of the receivers is to be changed for enlarging the second supply voltage range to at least the one of the receivers based on upper and lower limits of the first supply voltage ranges in the plurality of receivers.

9. The power transfer unit according to claim 1, further comprising a transmission portion transmitting a signal purporting that power receiving is to be stopped to a prescribed receiver.

10. The power transfer unit according to claim 9, wherein the control portion transmits the signal purporting that power receiving is to be stopped to a receiver inside the second supply voltage range through the transmission portion based on acquisition of feeding termination information feeds power to the prescribed receiver.

11. The power transfer unit according to claim 9, wherein the control portion alternately performs a control operation of transmitting the signal purporting that power receiving is to be stopped and a control operation of feeding power on a receiver inside the second supply voltage range and the prescribed receiver at a prescribed time interval.

12. The power transfer unit according to claim 2, wherein the control portion acquires the range of the supply voltage value by linear approximation or approximation to a quadratic or higher function based on the received voltage value information.

13. The power transfer unit according to claim 1, wherein the control portion sets the supply voltage value to a central value in the common range among the proper voltage ranges of the plurality of receivers.

14. The power transfer unit according to claim 1, wherein the control portion sets the supply voltage value to a value larger than a central value in the common range among the proper voltage ranges of the plurality of receivers.

15. A method for power transfer comprising steps of:
acquiring proper voltage ranges of a plurality of receivers;
acquiring respective first supply voltage ranges corresponding to the proper voltage ranges of the plurality of receivers for respective ones of the plurality of receivers; and
setting a supply voltage value in a second supply voltage range which is a mutually overlapping range of the first supply voltage ranges.

16. A receiver comprising:
a communication portion sending information of proper voltage ranges; and
a control portion sending the information of the proper voltage ranges through the communication portion to an external power transfer unit that acquires respective first supply voltage ranges corresponding to the proper voltage ranges of the plurality of receivers for respective ones of the plurality of receivers from the plurality of receivers and sets a supply voltage value in a second supply voltage range which is a mutually overlapping range of the first supply voltage ranges, wherein
the control portion sends received voltage value information to the external power transfer unit through the communication portion, and disconnects a load when the receiver receives a signal, purporting that power receiving is to be stopped, transmitted from the external power transfer unit to the receiver, of which the first supply voltage range is outside the second supply voltage range of the plurality of receivers.

17. The receiver according to claim 16, further comprising a receiving portion receiving a posting signal purporting that a position of the receiver from the external power transfer unit is to be changed.

18. The receiver according to claim 16, further comprising a receiving portion receiving a signal purporting that power receiving from the external power transfer unit is to be stopped.

19. The receiver according to claim 16, further comprising a charging information detection portion, wherein
the control portion sends power transfer termination information to the external power transfer unit through the communication portion based on charging information acquired by the charging information detection portion.

* * * * *